(12) United States Patent
Yan et al.

(10) Patent No.: US 11,252,169 B2
(45) Date of Patent: Feb. 15, 2022

(54) INTELLIGENT DATA AUGMENTATION FOR SUPERVISED ANOMALY DETECTION ASSOCIATED WITH A CYBER-PHYSICAL SYSTEM

(71) Applicant: General Electric Company, Schenectady, NY (US)

(72) Inventors: Weizhong Yan, Clifton Park, NY (US); Masoud Abbaszadeh, Clifton Park, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 121 days.

(21) Appl. No.: 16/374,067

(22) Filed: Apr. 3, 2019

(65) Prior Publication Data

US 2020/0322366 A1 Oct. 8, 2020

(51) Int. Cl.
*H04L 29/06* (2006.01)
*G06N 20/00* (2019.01)

(52) U.S. Cl.
CPC ......... *H04L 63/1425* (2013.01); *G06N 20/00* (2019.01)

(58) Field of Classification Search
CPC .............................. H04L 63/1425; G06N 20/00
See application file for complete search history.

(56) References Cited

U.S. PATENT DOCUMENTS

| 8,527,776 B2 | 9/2013 | Botros et al. |
| 9,386,030 B2 | 7/2016 | Vashist et al. |
| 10,592,779 B2* | 3/2020 | Madani ................ G06N 3/0481 |
| 2007/0088550 A1* | 4/2007 | Filev .................... G06K 9/6298 704/245 |
| 2012/0304008 A1* | 11/2012 | Hackstein .......... G05B 23/0229 714/26 |
| 2013/0060524 A1* | 3/2013 | Liao .................... G05B 23/0254 702/184 |
| 2015/0346066 A1* | 12/2015 | Dutta .................. G01M 99/008 702/183 |
| 2017/0353477 A1 | 12/2017 | Faigon et al. |

(Continued)

OTHER PUBLICATIONS

Salem et al., Anomaly Generation Using Generative Adversarial Networks in Host-Based Intrusion Detection, 2018, IEEE, 5 Pages (Year: 2018).*

(Continued)

*Primary Examiner* — Christopher C Harris
(74) *Attorney, Agent, or Firm* — Buckley, Maschoff & Talwalkar LLC

(57) ABSTRACT

A Cyber-Physical System ("CPS") may have monitoring nodes that generate a series of current monitoring node values representing current operation of the CPS. A normal space data source may store, for each monitoring node, a series of normal monitoring node values representing normal operation of the CPS. An abnormal data generation platform may utilize information in the normal space data source and a generative model to create generated abnormal to represent abnormal operation of the CPS. An abnormality detection model creation computer may receive the normal monitoring node values (and generate normal feature vectors) and automatically calculate and output an abnormality detection model including information about a decision boundary created via supervised learning based on the normal feature vectors and the generated abnormal data.

18 Claims, 19 Drawing Sheets

(56) References Cited

U.S. PATENT DOCUMENTS

| | | |
|---|---|---|
| 2018/0248905 A1 | 8/2018 | Cote et al. |
| 2018/0293734 A1* | 10/2018 | Lim ................. G06K 9/627 |
| 2018/0336439 A1 | 11/2018 | Kliger et al. |
| 2019/0147343 A1* | 5/2019 | Lev .................. G06N 3/088 |
| | | 706/25 |
| 2019/0368133 A1* | 12/2019 | Joshi ................ B64C 39/024 |

OTHER PUBLICATIONS

Zheng et al., One-Class Adversarial Nets for Fraud Detection, Jun. 5, 2018, Cornell University, 10 Pages (Year: 2018).*

Goernitz, Nico et al., "Toward Supervised Anomaly Detection", Journal of Artificial Intelligence Research, vol. 46, pp. 235-262, 2014, 28pgs.

Dai, Zihang et al., "Good Semi-supervised Learning that Requires a Bad GAN", arXiv.org, May 27, 2017, 14pgs.

Zheng, Panpan et al., "One-Class Adversarial Nets for Fraud Detection", arXiv.org, Jun. 5, 2018, 10pgs.

Lim, Swee Kiat et al., "DOPING: Generative Data Augmentation for Unsupervised Anomaly Detection with GAN", 2018 IEEE International Conference on Data Mining (ICDM), pp. 1122-1127, Singapore, 2018, 11pgs.

* cited by examiner

INTELLIGENT DATA AUGMENTATION FOR SUPERVISED ANOMALY DETECTION ASSOCIATED WITH A CYBER-PHYSICAL SYSTEM

BACKGROUND

Industrial control systems that operate physical systems (e.g., associated with power turbines, jet engines, locomotives, autonomous vehicles, etc.) are increasingly connected to the Internet. As a result, these control systems have been increasingly vulnerable to threats, such as cyber-attacks (e.g., associated with a computer virus, malicious software, etc.) that could disrupt electric power generation and distribution, damage engines, inflict vehicle malfunctions, etc. Current methods primarily consider attack detection in Information Technology ("IT," such as, computers that store, retrieve, transmit, manipulate data) and Operation Technology ("OT," such as direct monitoring devices and communication bus interfaces). Cyber-attacks can still penetrate through these protection layers and reach the physical "domain" as seen in 2010 with the Stuxnet attack. Such attacks can diminish the performance of a control system and may cause total shut down or even catastrophic damage to a plant. Currently, no methods are available to automatically detect, during a cyber-incident, attacks at the domain layer where sensors, controllers, and actuators are located. In some cases, multiple attacks may occur simultaneously (e.g., more than one actuator, sensor, or parameter inside control system devices might be altered maliciously by an unauthorized party at the same time). Note that some subtle consequences of cyber-attacks, such as stealthy attacks occurring at the domain layer, might not be readily detectable (e.g., when only one monitoring node, such as a sensor node, is used in a detection algorithm). It may also be important to determine when a monitoring node is experiencing a fault (as opposed to a malicious attack) and, in some cases, exactly what type of fault is occurring and where it is located. Existing approaches to protect an industrial control system, such as failure and diagnostics technologies, may not adequately address these problems—especially when a substantial number of monitoring nodes need to be analyzed.

In addition, many current attack detection technologies are passive and rely solely on monitoring data collected from the cyber-physical system. These types of protection schemes may fail in the face of a mass spoofing attack and/or a replay attack. It would therefore be desirable to protect a cyber-physical system from cyber-attacks and other abnormal operation in an automatic and accurate manner even when attacks percolate through the IT and OT layers and directly harm control systems. Moreover, in many cases a substantial amount of information about the normal operation of a cyber-physical system may be available while much less (or even no) information is available about the abnormal (e.g., cyber-attacked or failed) operation of the system.

SUMMARY

Some embodiments are associated with techniques for augmenting supervised anomaly detection methods with synthesized abnormal data. Such an approach may enable supervised anomaly detection methods to be used in situations where abnormal data is not available or, at beast, sparsely available. The supervised anomaly detection may let a system achieve much-improved detection performance. Specifically, some embodiments may synthesize abnormal data by learning the characteristics/distribution of normal data. More specifically, some embodiments use generative models, a machine learning technique, to learn the distribution of normal data and generate abnormal data that are complementary to the distribution of the normal data.

According to some embodiments, a Cyber-Physical System ("CPS") may have monitoring nodes that generate a series of current monitoring node values over time that represent current operation of the CPS. A normal space data source may store, for each monitoring node, a series of normal monitoring node values representing normal operation of the CPS. An abnormal data generation platform may utilize information in the normal space data source and a generative model to create generated abnormal data to represent abnormal operation of the CPS. An abnormality detection model creation computer may receive the normal monitoring node values (and generate normal feature vectors) and automatically calculate and output an abnormality detection model including information about a decision boundary created via supervised learning based on the normal feature vectors and the generated abnormal data.

Some embodiments comprise: means for utilizing, by an abnormal data generation platform, information in a normal space data source and a generative model to create generated abnormal data to represent abnormal operation of a CPS, wherein the normal space data source stores, for each of a plurality of monitoring nodes, a series of normal monitoring node values over time that represent normal operation of the CPS; means for receiving, at an abnormality detection model creation computer, the series of normal monitoring node values to generate a set of normal feature vectors; and means for automatically calculating and outputting an abnormality detection model including information about at least one decision boundary created via supervised learning based on the set of normal feature vectors and the generated abnormal data.

Some technical advantages of some embodiments disclosed herein are improved systems and methods to protect a CPS from abnormalities, such as cyber-attacks, in an automatic and accurate manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

A CPS, such as an Industrial Control Systems ("ICS"), might be associated with large-scale systems having many monitoring nodes. Some embodiments described herein may provide scalable and efficient solutions for abnormality (e.g., cyber-attack or fault) detection in such systems. According to some embodiments, a system level detection decision may be made using a global decision boundary. The system may also compute decision boundaries for each subsystem in a similar fashion. The features used to compute decision boundaries for each subsystem may be comprised of, for example, local features for each component within the subsystem plus interacting features of two or more of such components.

Figure 1:
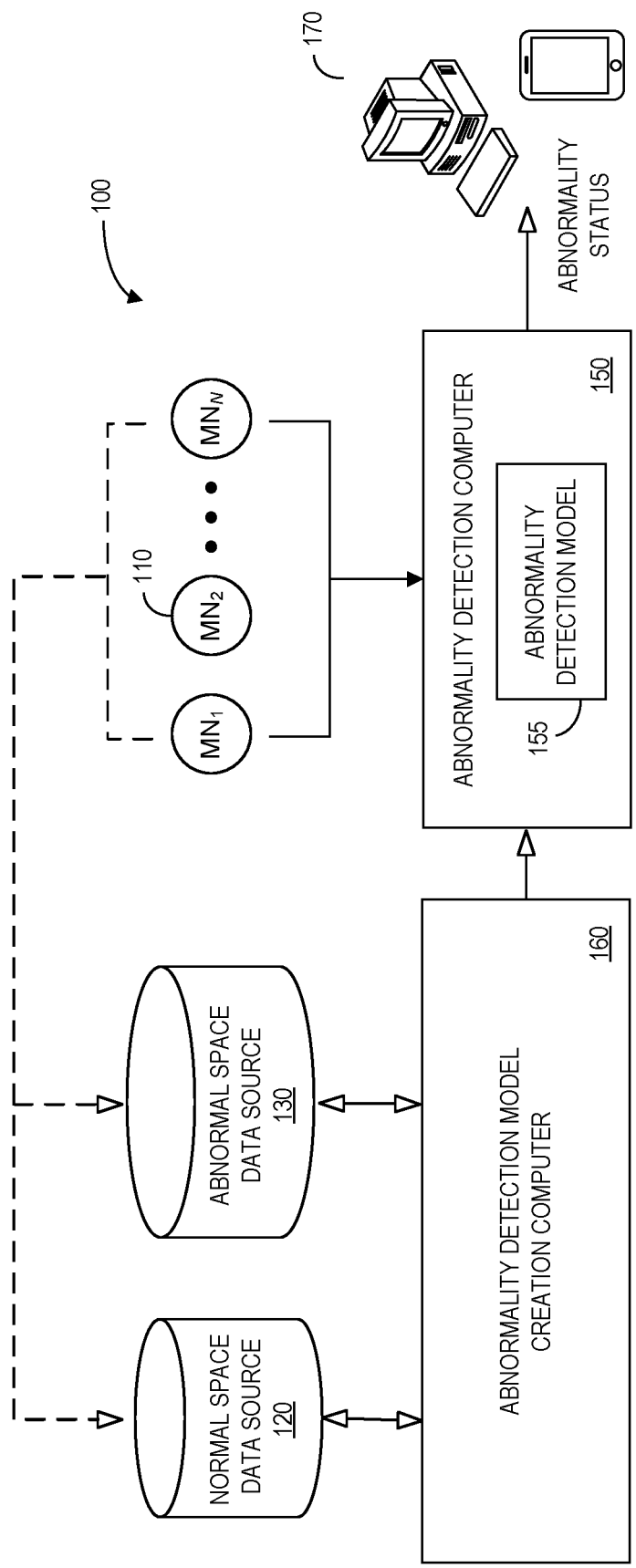
FIG. 1 is a high-level block diagram of a system for CPS protection.

FIG. 1 is a high-level block diagram of a system 100 for CPS protection. The system 100 may include monitoring node sensors 110 $MN_1$ through $MN_N$, a "normal space" data source 120, and an "abnormal space" data source 130. The normal space data source 120 might store, for each of the plurality of monitoring nodes 110, a series of normal values over time that represent normal operation of a CPS (e.g., generated by a model or collected from actual sensor data as illustrated by the dashed line in FIG. 1). The abnormal space data source 130 might store, for each of the monitoring nodes 110, a series of abnormal values that represent abnormal operation of the CPS (e.g., when the system is experiencing a cyber-attack or a fault).

Information from both the normal space data source 120 and the abnormal space data source 130 may be provided to an abnormality detection model creation computer 160 that uses this data to create a decision boundary (that is, a boundary that separates normal behavior from abnormal behavior). The decision boundary may then be used by an abnormality detection computer 150 executing an abnormality detection model 155. The abnormality detection model 155 may, for example, monitor streams of data from the monitoring nodes 110 comprising data from sensor nodes, actuator nodes, and/or any other critical monitoring nodes (e.g., sensor nodes $MN_1$ through $MN_N$) and automatically output global and local abnormality status signal to one or more remote monitoring devices 170 when appropriate (e.g., for display to an operator or to have an abnormality localized using any of the embodiments described herein). According to some embodiments, information about detected threats or faults may be transmitted back to a CPS control system.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The abnormality detection model creation computer 160 may store information into and/or retrieve information from various data stores, such as the normal space data source 120 and/or the abnormal space data source 130. The various data sources may be locally stored or reside remote from the abnormality detection model creation computer 160. Although a single abnormality detection model creation computer 160 is shown in FIG. 1, any number of such devices may be included. Moreover, various devices described herein might be combined according to embodiments of the present invention. For example, in some embodiments, the abnormality detection model creation computer 160 and one or more data sources 120, 130 might comprise a single apparatus. The abnormality detection model creation computer 160 functions may be performed by a constellation of networked apparatuses, in a distributed processing or cloud-based architecture.

A user may access the system 100 via one of the monitoring devices 170 (e.g., a Personal Computer ("PC"), tablet, or smartphone) to view information about and/or manage abnormality information in accordance with any of the embodiments described herein. In some cases, an interactive graphical display interface may let a user define and/or adjust certain parameters (e.g., abnormality detection trigger levels or remediation steps) and/or provide or receive automatically generated recommendations or results from the abnormality detection model creation computer 160 and/or abnormality detection computer 150.

Thus. some embodiments described herein may use time series data from one or more monitoring nodes 110 from a cyber-physical (i.e., industrial or enterprise) asset and provide a reliable abnormality detection with a low false positive rate. The system may extract features from the time series data for each monitoring node. The term "feature" may refer to, for example, mathematical characterizations of data. Examples of features as applied to data might include the maximum and minimum, mean, standard deviation, variance, settling time, Fast Fourier Transform ("FFT") spectral components, linear and non-linear principal components, independent components, sparse coding, deep learning, etc. The type and number of features for each monitoring node might be optimized using domain-knowledge and/or a feature discovery process. The features may be, for example, calculated over a sliding window with consecutive samples of specified duration from time series data. The length of the window and the duration of overlap for each batch may be determined from domain knowledge and an inspection of the data or using batch processing. Note that features may be computed at the local level (associated with each monitoring node) and the global level (associated with all the monitoring nodes, i.e., the whole asset). The time-domain values of the nodes or their extracted features may be, according to some embodiments, normalized for better numerical conditioning.

Note that methods of attack detection, or more generally Anomaly Detection ("AD"), can be broadly categorized in two groups: supervised and semi-supervised. Supervised learning, such as is illustrated in the system of FIG. 1, is a machine learning task of learning a function that maps an input to an output based on example input-output pairs. It infers a function from labeled training data consisting of a set of training examples. In supervised learning, each example is a pair consisting of an input object (typically a vector) and a desired output value (also called the supervisory signal). A supervised learning algorithm analyzes the training data (including information from both the normal space data source 120 and the abnormal space data source 130) and produces an inferred function, which can be used for mapping new examples.

While supervised AD methods require both normal and abnormal data, semi-supervised AD methods work on normal data only. Unsupervised learning, also known as self-organization, is associated with a method of modelling the probability density of inputs. For example, cluster analysis machine learning might group data that has not been labelled, classified, or categorized (e.g., using only information from the normal space data source 120). Semi-supervised learning is a class of machine learning tasks and techniques that also make use of unlabeled data for training—typically a small amount of labeled data (e.g., in the abnormal space data source 130) with a large amount of unlabeled data (e.g., in the normal space data source 120). Semi-supervised learning falls between unsupervised learning (without any labeled training data) and supervised learning (with completely labeled training data).

When sufficient and well-distributed data (both normal and abnormal) are available, supervised AD methods have proven to be superior over semi-supervised methods in terms of detection performance (accuracy and robustness). Thus, supervised AD methods are theoretically a preferred choice for achieving highest possible detection performance.

In practice, however, abnormal or attack data for most real-world applications, particularly CPS attack detection, are not available or, at best, only sparsely available. One solution to this situation is to use semi-supervised AD methods that work on normal data only, which might not be able to achieve a desired detection performance. Alternatively, when a physics-based simulator is available, the system might simulate abnormal or attack data such that a supervised AD method can still be used. However, it is still infeasible to simulate all possible abnormalities or attacks, because abnormalities and attacks evolve over time and new types of attacks constantly emerge. Without sufficient, well-distributed data samples for all abnormalities/attacks, supervised AD methods may not be able to achieve a required performance potential.

Because achieving the highest possible detection performance (e.g., represented by accuracy and robustness) is almost always a key objective when developing an AD system, enabling supervised AD methods (with superior detection performance) to work effectively even in situations where abnormal or attack data is not (or is sparsely) available may be desirable when developing high performance AD systems. Some embodiments described herein are associated with techniques that target this problem.

Note that a developer might use other approaches (e.g., by injecting random noise to the normal data) to synthesize more data. Such synthesized data, however, will not represent true abnormal data which can mislead a supervised AD model during training and degrade detection performance.

Figure 2:
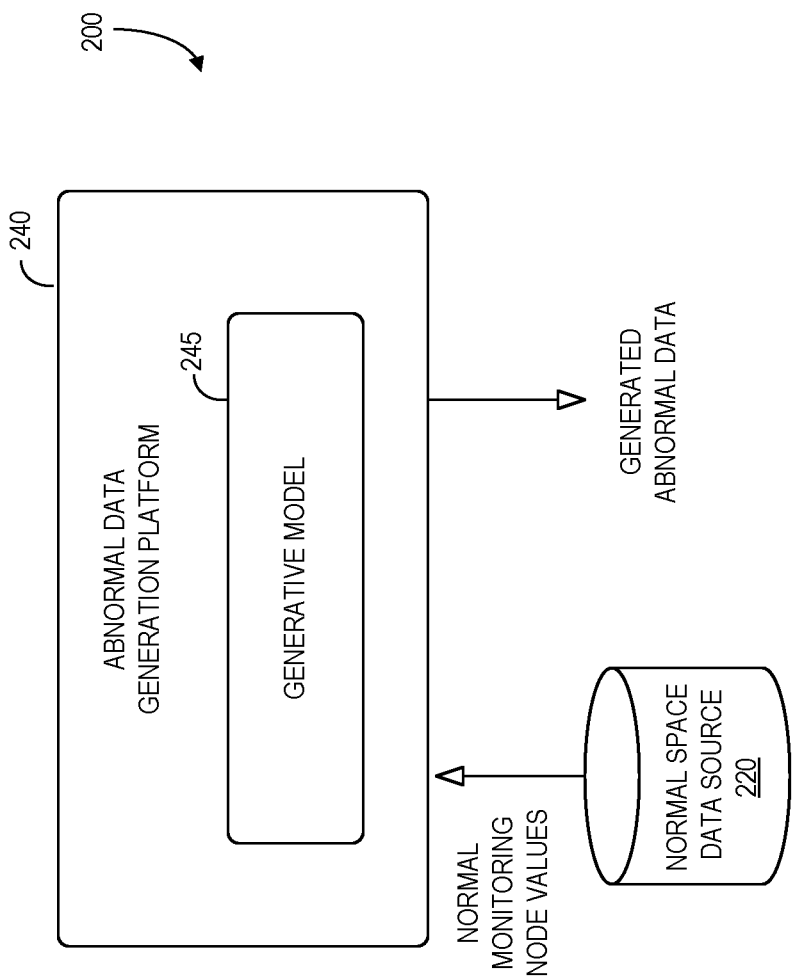
FIG. 2 is a high-level block diagram of a system in accordance with some embodiments.

FIG. 2 is a high-level block diagram of a system 200 in accordance with some embodiments. The system 200 may, for example, protect a CPS having a plurality of monitoring nodes each generating a series of current monitoring node values over time that represent current operation of the CPS. In particular, the system may include a normal space data source 220 storing, for each of the plurality of monitoring nodes, a series of normal monitoring node values over time that represent normal operation of the CPS. An abnormal data generation platform 240 may utilize information in the normal space data source 220 and a generative model 245 to create generated abnormal data to represent abnormal operation of the CPS. The generated abnormal data might include, for example, automatically generated abnormal feature vectors in feature space. According to some embodiments, the generated abnormal data includes automatically generated abnormal sensor data (which may then be used to create abnormal feature vectors).

Figure 3:
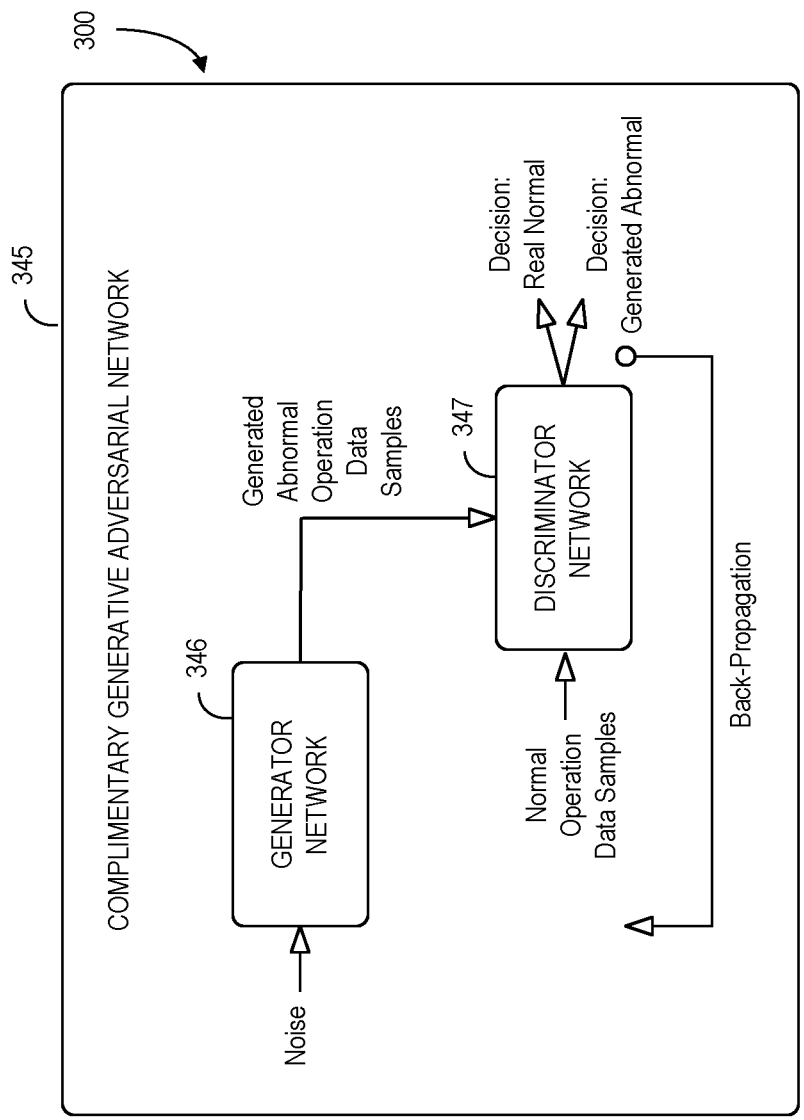
FIG. 3 illustrates a generative model according to some embodiments.

The generative model 245 may therefore be used to create generated abnormal data using information from the normal space data source 220. For example, FIG. 3 illustrates 300 a complementary Generative Adversarial Network ("GAN") 345 according to some embodiments. In particular, a generator network 346 may be trained to learn a generative distribution that is close to the complementary distribution of the normal data while a discriminator network 347 is trained to distinguish the complementary samples from the real normal data. The generator network 346 may learn to map from a latent space to a data distribution of interest, while the discriminator network 347 distinguishes candidates produced by the generator from the true data distribution. The training objective of the generator network 346 may be to increase the error rate of the discriminator network 347 (i.e., to "fool" the discriminator network 347) by producing novel candidates of synthetic abnormal operation data that the discriminator network 347 interprets as not synthesized (are part of a true data distribution). Backpropagation may be applied in both networks 346, 347 to improve performance of the complementary GAN. The generator network 346 might comprise, for example, a deconvolutional neural network while the discriminator network 347 is implemented via a convolutional neural network. In this way, some embodiments may utilize the complementary GAN 345 to create synthetic abnormal samples that, when combined with the normal data, let a system use supervised AD methods (achieving improved detection performance).

Figure 4:
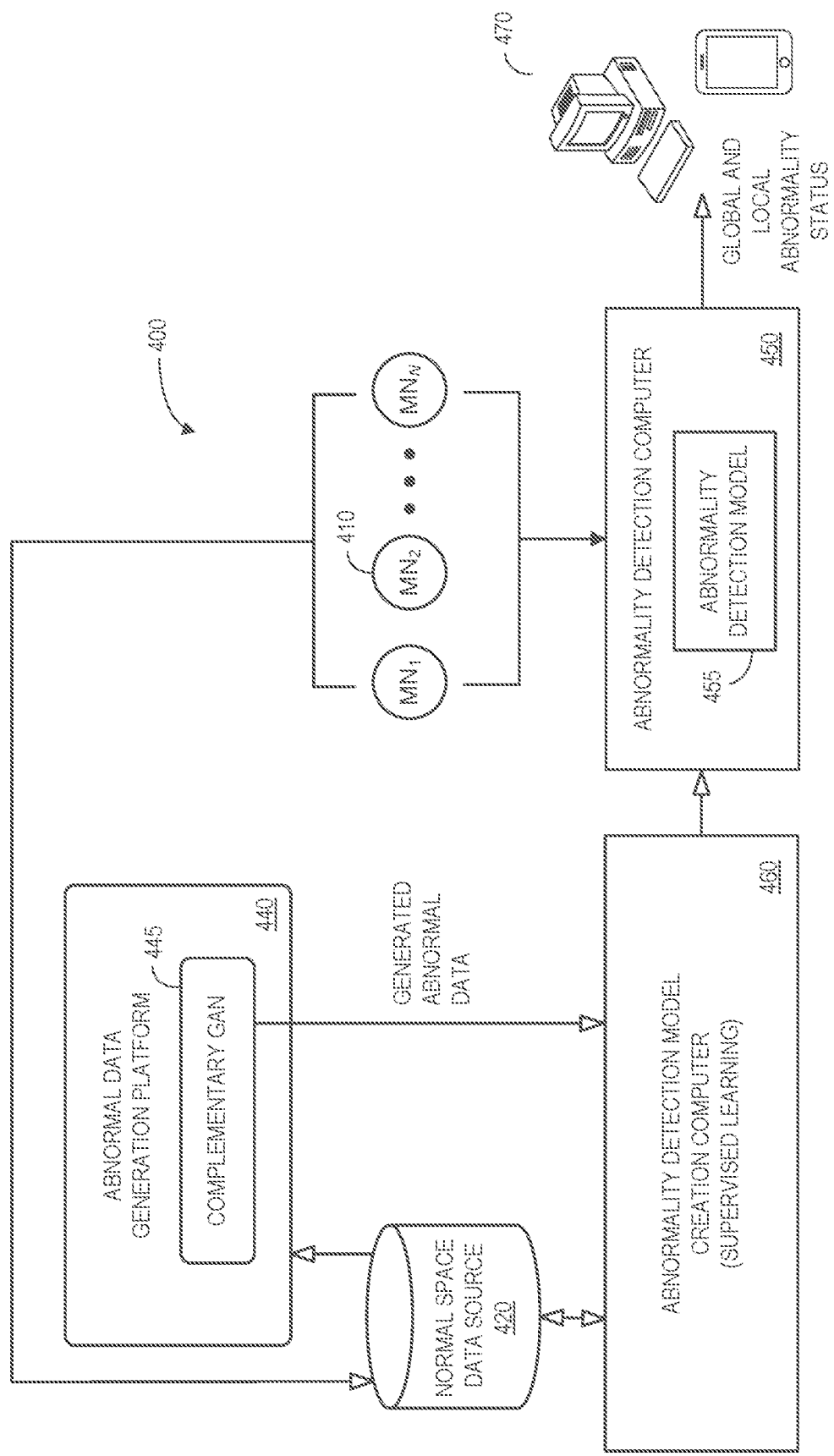
FIG. 4 is a high-level block diagram of a system that may be provided in accordance with some embodiments.

FIG. 4 is a high-level block diagram of a system 400 that may be provided in accordance with some embodiments. As with FIG. 1, the system 400 may include monitoring node sensors 410 $MN_1$ through $MN_N$, a "normal space" data source 420, and an "abnormal space" data source 430. The normal space data source 420 might store, for each of the plurality of monitoring nodes 410, a series of normal values over time that represent normal operation of a CPS (e.g., generated by actual sensor data). An abnormal data generating platform 440 may retrieve information from the normal space data store and create generated abnormal data (e.g., in feature space or sensor space) utilizing a complementary GAN 445.

Information from the normal space data source 420 and the generated abnormal data may be provided to an abnormality detection model creation computer 460 that uses this data and supervised learning to create a decision boundary (that is, a boundary that separates normal behavior from abnormal behavior). The decision boundary may then be used by an abnormality detection computer 450 executing an abnormality detection model 455. The abnormality detection model 455 may, for example, monitor streams of data from the monitoring nodes 410 comprising data from sensor nodes, actuator nodes, and/or any other critical monitoring nodes (e.g., sensor nodes $MN_1$ through $MN_N$) and automatically output global and local abnormality status signal to one or more remote monitoring devices 470 when appropriate (e.g., for display to an operator or to have an abnormality localized using any of the embodiments described herein).

Figure 5:
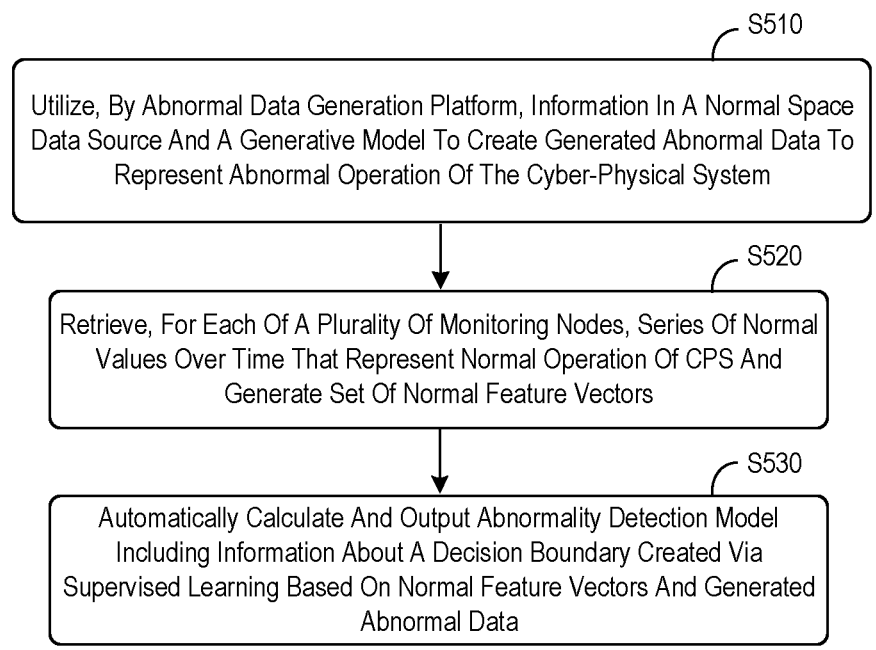
FIG. 5 is a model creation method according to some embodiments.

FIG. 5 illustrates a model creation method that might be performed by some or all of the elements of the system 400 described with respect to FIG. 4. At S510, an abnormal data generation platform may utilize information in a normal space data source and a generative model to create generated abnormal data to represent abnormal operation of the CPS. The normal space data source may store, for each of the plurality of monitoring nodes, a series of normal monitoring node values over time that represent normal operation of the CPS. The generative model might comprise, according to some embodiments, a complementary GAN with a generator network and a discriminator network. Note that the abnormal data generation platform might create the generated abnormal data utilizing either no actual abnormal information from the CPS or sparse actual abnormal information from the CPS.

To help ensure that the generated samples are constrained in abnormal space and make physical sense, and to help ensure the convergence of a complementary GAN model during training, the generative model might involve, according to some embodiments, using techniques such as feature matching and virtual batch normalization during the model training process. Other techniques that may help ensure consistency of generated samples between two consecutive time stamps may be used in some embodiments.

At S520, the system may retrieve, for each of a plurality of monitoring nodes (e.g., sensor nodes, ac, controller nodes, etc.), a series of normal values over time that represent normal operation of the CPS and a set of normal feature vectors may be generated. The series of normal values might be obtained, for example, by utilizing Design of Experiments ("DoE") methodology and running a physics-based model/simulator of the CPS. At S530, the system may automatically calculate and output an abnormality detection model including information about a decision boundary created via supervised learning based on the normal feature vectors and the generated abnormal data.

Thus, a decision boundary may be automatically calculated for an abnormality detection model using supervised learning based on the set of normal feature vectors and the set of generated (i.e., complementary GAN synthesized) abnormal data. According to some embodiments, the decision boundary might be associated with a line, a hyperplane, a non-linear boundary separating normal space from threatened space, and/or a plurality of decision boundaries. Moreover, a decision boundary might comprise a multi-class decision boundary separating normal space, attacked space, and degraded operation space (e.g., when a sensor fault occurs). In addition, note that the abnormality detection model might be associated with the decision boundary, feature mapping functions, and/or feature parameters.

Figure 6:
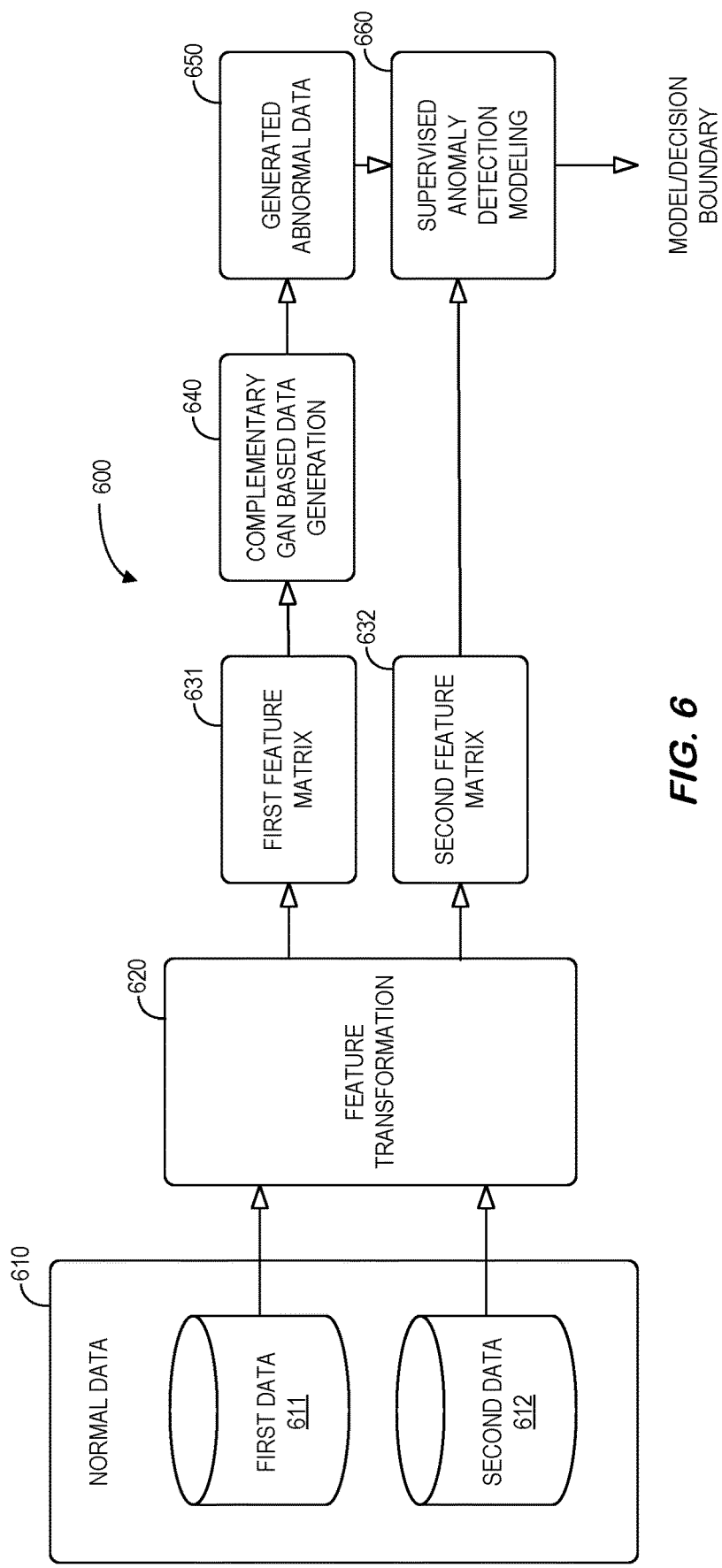
FIG. 6 is a more detailed block diagram of a system according to some embodiments.

FIG. 6 is a more detailed block diagram of a system 600 according to some embodiments. The system 600 utilizes normal data 610 including first data 611 and second data 612. A feature transformation 620 is performed on the first data 611 and second data 612 to create a first feature matrix 631 and a second feature matrix 632. Complementary GAN based data generation 640 is performed on the first feature matrix 631 to created generated abnormal data 650. Supervised anomaly detection modeling 660 may then use both the generated abnormal data 650 and the second feature matrix 632 (e.g., associated with normal data) to create a model and/or decision boundary.

Figure 7:
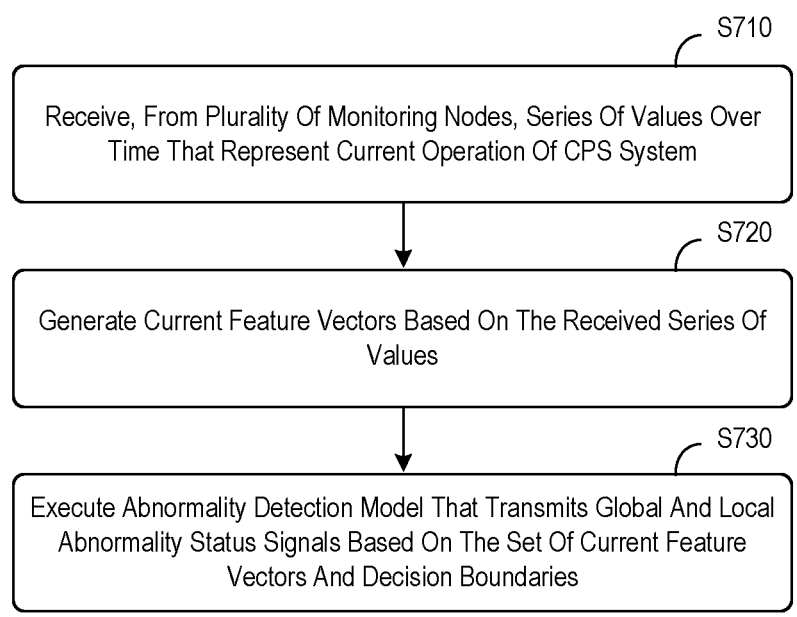
FIG. 7 is an abnormality status method according to some embodiments.

The decision boundary can then be used to detect abnormal operation (e.g., as might occur during cyber-attacks). For example, FIG. 7 is an abnormality status method according to some embodiments. At S710, the system may receive, from a plurality of monitoring nodes, a series of current values over time that represent a current operation of the CPS. At S720, an attack detection platform computer may then generate current feature vectors based on the received series of current values. At S730, an abnormality detection model may be executed to transmit an abnormal status signal based on the set of current feature vectors and a decision boundary when appropriate (e.g., when a cyber-attack or fault is detected). According to some embodiments, one or more response actions may be performed when an abnormality status signal is transmitted. For example, the system might automatically shut down all or a portion of the CPS (e.g., to let the detected potential cyber-attack be further investigated). As other examples, one or more parameters might be automatically modified, a software application might be automatically triggered to capture data and/or isolate possible causes, etc.

Some embodiments described herein may take advantage of the physics of a control system by learning a priori from tuned high-fidelity equipment models and/or actual "on the job" data to detect single or multiple simultaneous adversarial threats to the system. Moreover, according to some embodiments, all monitoring node data may be converted to features using advanced feature-based methods, and the real-time operation of the control system may be monitored in substantially real-time. Abnormalities may be detected by classifying the monitored data as being "normal" or disrupted (or degraded). This decision boundary may be constructed using dynamic models and may help enable early detection of vulnerabilities (and potentially avert catastrophic failures) allowing an operator to restore the control system to normal operation in a timely fashion.

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with DoE techniques. Moreover, multiple algorithmic methods (e.g., support vector machines or machine learning techniques) may be used to generate decision boundaries. Since boundaries may be driven by measured data (or data generated from high-fidelity models), defined boundary margins may help to create an abnormal zone in a multi-dimensional feature space. Moreover, the margins may be dynamic in nature and adapted based on a transient or steady state model of the equipment and/or be obtained while operating the system as in self-learning systems from incoming data stream. According to some embodiments, a training method may be used for supervised learning to teach decision boundaries. This type of supervised learning may take into account on operator's knowledge about system operation (e.g., the differences between normal and abnormal operation).

Figure 8:
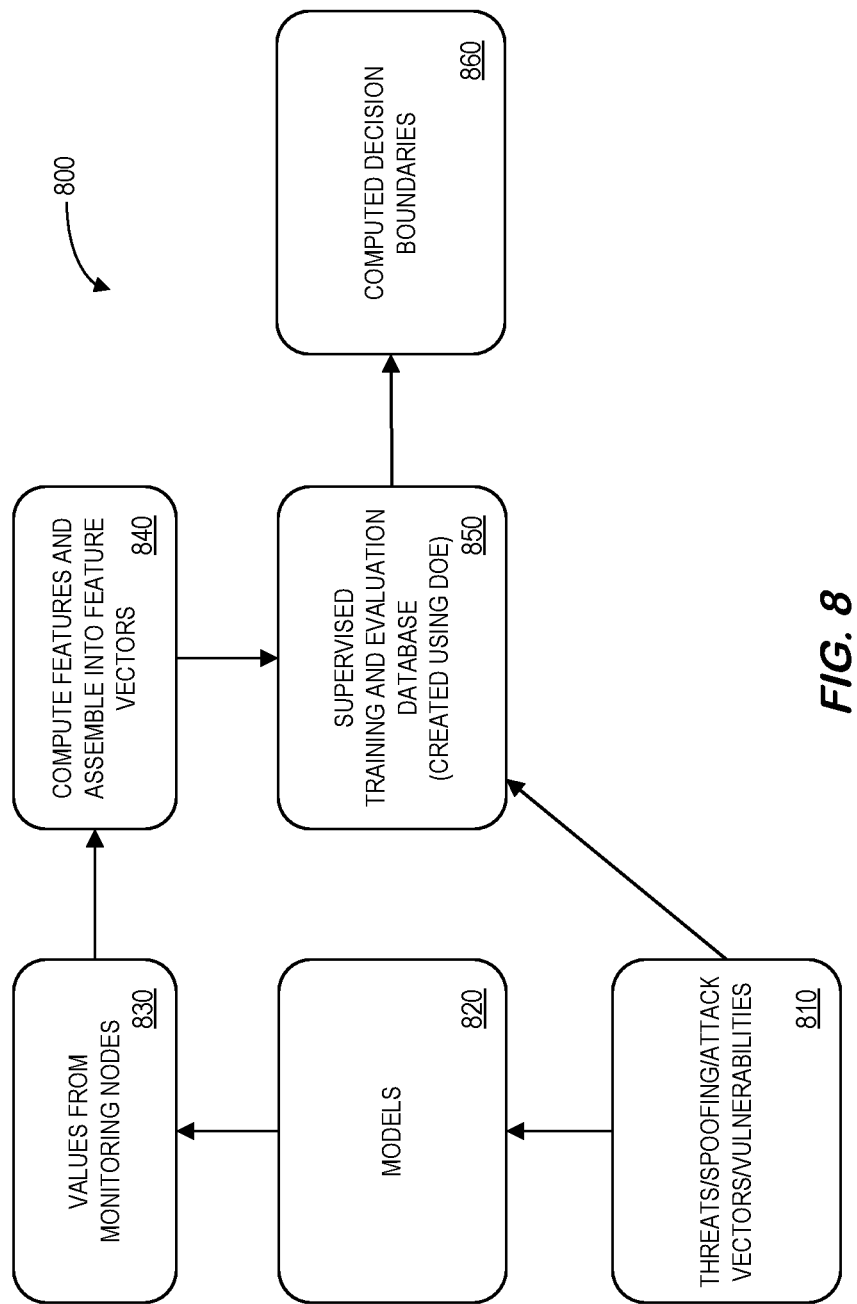
FIG. 8 illustrates an off-line data generation and boundary creation process in accordance with some embodiments.

FIG. 8 illustrates an off-line data generation and boundary creation process 800 in accordance with some embodiments. Information about threats, spoofing, attack vectors, vulnerabilities, etc. 810 may be provided to models 820 for generating both normal and abnormal (attack) values of monitoring nodes 830 using DoE techniques. The simulated data 830 from monitoring nodes are computed and assembled into a feature vector 840 to be stored in the training and evaluation database 850. The data in the training and evaluation database 850 may then be used to compute decision boundaries 860 to distinguish between normal operation and abnormal operation. According to some embodiments, the process 800 may include a prioritization of monitoring nodes and anticipated attack vectors to form one or more data sets to develop decision boundaries. Attack vectors are abnormal values at critical inputs where malicious attacks can be created at the domain level that will make the system go into threatened/abnormal space. In addition, the models 820 may comprise high-fidelity models that can be used to create a data set (e.g., a set that describes threat space as "levels of threat conditions in the system versus quantities from the monitoring nodes"). The data 830 from the monitoring nodes might be, for example, quantities that are captured for a length of from 60 to 80 seconds from sensor nodes, actuator nodes, and/or controller nodes (and a similar data set may be obtained for "levels of normal operating conditions in the system versus quantities from the monitoring nodes"). This process will result in a data set for "normal space." The 60 to 80 seconds long quantities may be used to compute features 840 using feature engineering to create feature vectors. Complementary GAN based techniques may then be used to create a data set for "abnormal space" and feature vectors. These feature vectors can then be used with supervised learning techniques to obtain a decision boundary that separates the data sets for abnormal space and normal space for various elements of the CPS (to detect an anomaly such as a cyber-attack or naturally occurring fault).

Since attacks might be multi-prong (e.g., multiple attacks might happen at once), DoE experiments may be designed to capture the attack space (e.g., using full factorial, Taguchi screening, central composite, and/or Box-Behnken). When models are not available, these DoE methods can also be used to collect data from real-world asset control system. Experiments may run, for example, using different combinations of simultaneous attacks. Similar experiments may be run to create a data set for the normal operating space. According to some embodiments, the system may detect "degraded" or faulty operation as opposed to a threat or attack. Such decisions may require the use of a data set for a degraded and/or faulty operating space.

Figure 9:
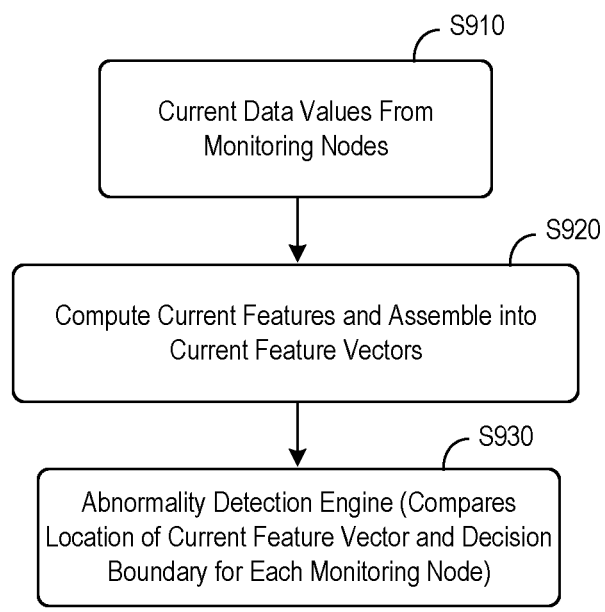
FIG. 9 illustrates a real-time process according to some embodiments.

FIG. 9 illustrates a real-time process to protect a CPS according to some embodiments. At S910, current data from monitoring nodes may be gathered (e.g., in batches of from 60 to 80 seconds). At S920, the system may compute features and form feature vectors. For example, the system might use weights from a principal component analysis as features. At S930, an abnormality detection engine may compare location of feature vectors to a decision boundary to make a determination (and output an abnormal signal if necessary). According to some embodiments, monitoring node data from models (or from real systems) may be expressed in terms of features since features are a high-level representation of domain knowledge and can be intuitively explained. Moreover, embodiments may handle multiple features represented as vectors and interactions between multiple sensed quantities might be expressed in terms of "interaction features."

Note that many different types of features may be utilized in accordance with any of the embodiments described herein, including principal components (weights constructed with natural basis sets) and statistical features (e.g., mean, variance, skewness, kurtosis, maximum, minimum values of time series signals, location of maximum and minimum values, independent components, etc.). Other examples include deep learning features (e.g., generated by mining experimental and/or historical data sets) and frequency domain features (e.g., associated with coefficients of Fourier or wavelet transforms). Embodiments may also be associated with time series analysis features, such as cross-correlations, auto-correlations, orders of the autoregressive, moving average model, parameters of the model, derivatives and integrals of signals, rise time, settling time, neural networks, etc. Still other examples include logical features (with semantic abstractions such as "yes" and "no"), geographic/position locations, and interaction features (mathematical combinations of signals from multiple monitoring nodes and specific locations). Embodiments may incorporate any number of features, with more features allowing the approach to become more accurate as the system learns more about the physical process and threat. According to some embodiments, dissimilar values from monitoring nodes may be normalized to unit-less space, which may allow for a simple way to compare outputs and strength of outputs.

Figure 10:
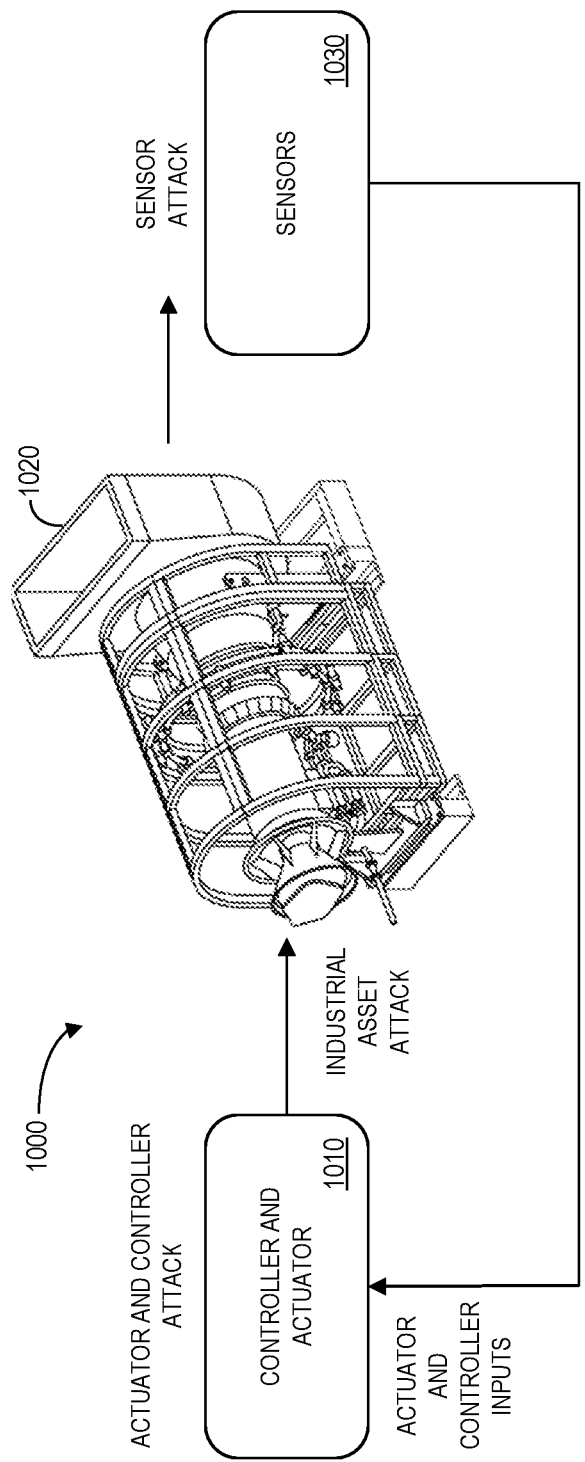
FIG. 10 is an example associated with a CPS engine in accordance with some embodiments.

FIG. 10 is an example 1000 associated with a CPS in accordance with some embodiments. In particular, the example includes a controller and actuator portion 1010 subject to actuator and controller attacks, a gas turbine portion 1020 subject to state attacks, and sensors 1030 subject to sensor attacks. By way of examples only, the sensors 1030 might comprise physical and/or virtual sensors associated with temperatures, airflows, power levels, etc. The actuators might be associated with, for example, motors. By monitoring the information in the CPS, a threat detection platform may be able to detect cyber-attacks and failures (e.g., using current feature vectors and a decision boundary) that could potentially cause substantial damage.

Figure 11:
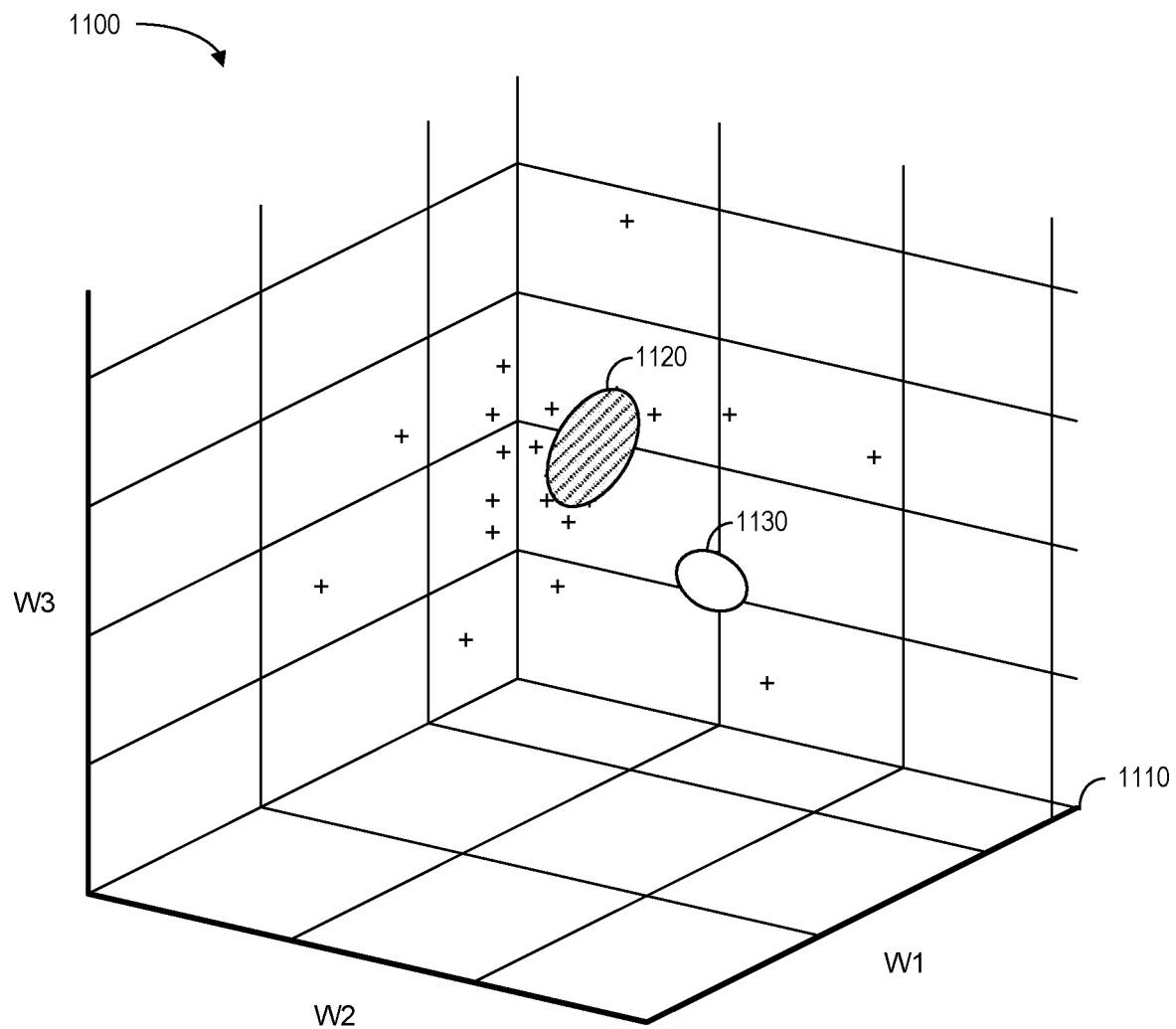
FIG. 11 illustrates three dimensions of sensor outputs in accordance with some embodiments.

FIG. 11 illustrates 1100 three dimensions of monitoring node outputs in accordance with some embodiments. In particular, a graph 1110 plots monitoring node outputs ("+") in three dimensions, such as dimensions associated with Principal Component Features ("PCF"): w1, w2, and w3. Moreover, the graph 1110 includes an indication of a normal operating space decision boundary 1120 that might be appropriate when no watermarking signals are being injected into the system. Although a single contiguous boundary 1120 is illustrated in FIG. 11, embodiments might be associated with multiple regions. The graph 1110 further includes a normal operating space decision boundary 1130 that might be appropriate in certain conditions (e.g., an industrial asset's current mode of operation). Note that PCF information may be represented as weights in reduced dimensions. For example, data from each monitoring node may be converted to low dimensional features (e.g., weights). According to some embodiments, monitoring node data is normalized as follows:

$$S_{normalized}(k) = \frac{S_{nominal}(k) - S_{original}(k)}{\bar{S}_{nominal}}$$

where S stands for a monitoring node quantity at "k" instant of time. Moreover, output may then be expressed as a weighted linear combination of basis functions as follows:

$$S = S_0 + \sum_{j=1}^{N} w_j \Psi_j$$

where $S_0$ is the average monitoring node output with all threats, $w_j$ is the $j^{th}$ weight, and $\Psi_j$ is the $j^{th}$ basis vector. According to some embodiments, natural basis vectors are obtained using a covariance of the monitoring nodes' data matrix. Once the basis vectors are known, weight may be found using the following equation (assuming that the basis sets are orthogonal):

$$w_j = (S-S_0)^T \Psi_j$$

Note that weights may be an example of features used in a feature vector.

Thus, embodiments may enable the passive detection of indications of abnormal operations using real-time signals from monitoring nodes. Moreover, the detection framework may allow for the development of tools that facilitate proliferation of the invention to various systems (e.g., turbines) in multiple geolocations. According to some embodiments, distributed detection systems enabled by this technology (across multiple types of equipment and systems) will allow for the collection of coordinated data to help detect multi-prong attacks. Note that the feature-based approaches described herein may allow for extended feature vectors and/or incorporate new features into existing vectors as new learnings and alternate sources of data become available. As a result, embodiments may detect a relatively wide range of cyber-threats (e.g., stealth, replay, covert, injection attacks, etc.) as the systems learn more about their characteristics. Embodiments may also reduce false positive rates as systems incorporate useful key new features and remove ones that are redundant or less important. Note that the detection systems described herein may provide early warning to CPS operators so that an attack may be thwarted (or the effects of the attack may be blunted), reducing damage to equipment.

According to some embodiments, a system may further localize an origin of a threat to a particular monitoring node. For example, the localizing may be performed in accordance with a time at which a decision boundary associated with one monitoring node was crossed as compared to a time at which a decision boundary associated with another monitoring node was crossed. According to some embodiments, an indication of the particular monitoring node might be included in an abnormality status signal.

Some embodiments of the algorithm may utilize feature-based learning techniques based on high-fidelity physics models and/or machine operation data (which would allow the algorithm to be deployed on any system) to establish a high dimensional decision boundary. As a result, detection may occur with more precision using multiple signals, making the detection more accurate with less false positives. Moreover, embodiments may detect multiple attacks on control signals, and rationalize where the root cause attack originated. For example, the algorithm may decide if a signal is anomalous because of a previous signal attack, or if it is instead independently under attack. This may be accomplished, for example, by monitoring the evolution of the features as well as by accounting for time delays between attacks.

Figure 12:
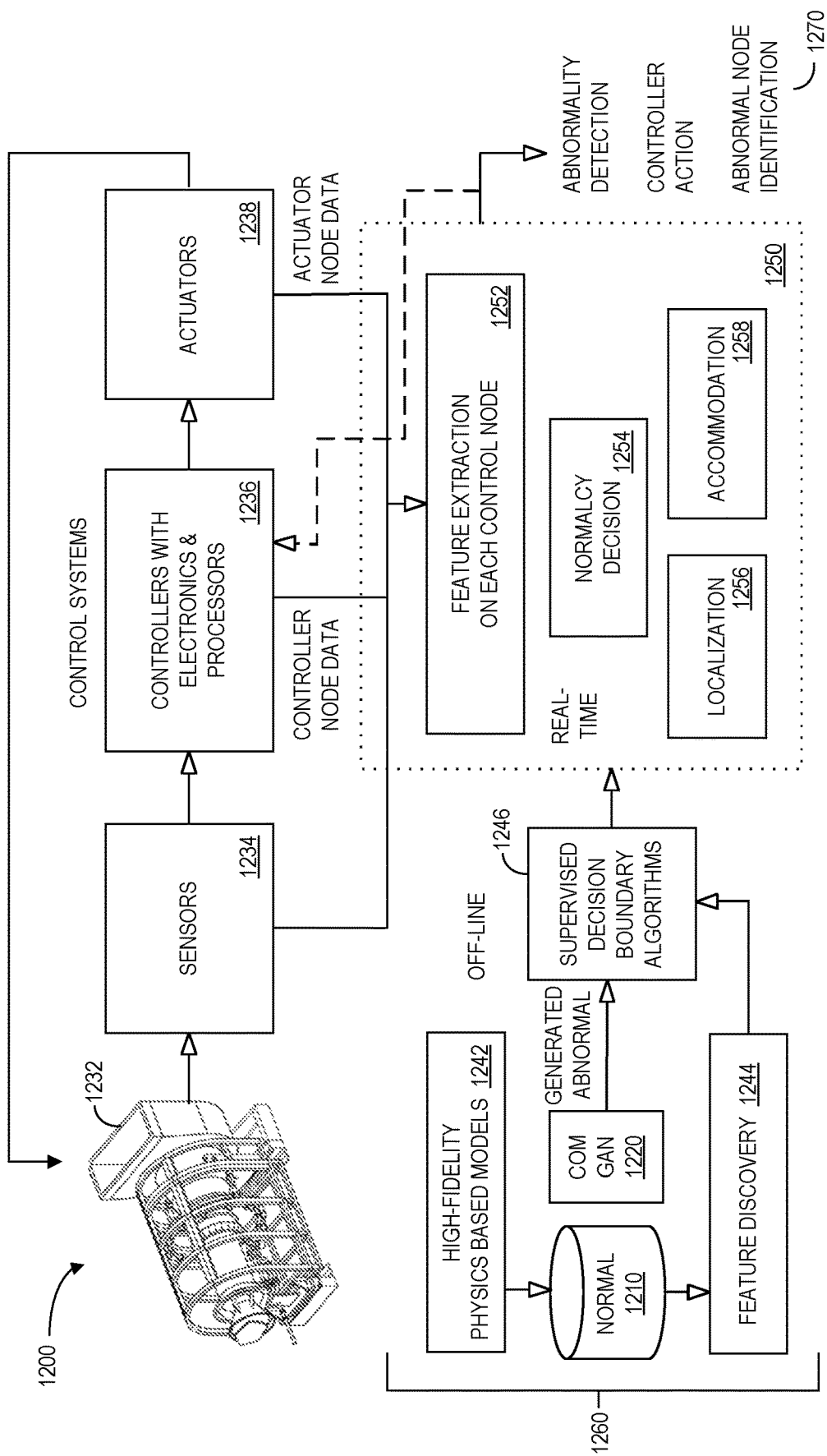
FIG. 12 is an abnormality status system according to some embodiments.

A cyber-attack detection and localization algorithm may process a real-time CPS signal data stream and then compute features (multiple identifiers) which can then be compared to the signal-specific decision boundary. A block diagram of a system 1200 utilizing a signal-specific CPS abnormality detection and localization algorithm according to some embodiments is provided in FIG. 12. In particular, a gas turbine 1232 provides information to sensors 1234 which helps controllers with electronics and processors 1236 adjust actuators 1238. An abnormality detection system 1260 may include one or more high-fidelity physics-based models 1242 associated with the turbine 1232 to create normal data 1210. A complementary GAN 1220 may synthesize generated abnormal data (in either feature space or sensor value/data space). The normal data 1210 (after being accessed by a feature discovery component 1244) and the generated abnormal data from the complementary GAN 1220 may be processed by decision boundary algorithms 1246 while off-line (e.g., not necessarily while the gas turbine 1232 is operating). The decision boundary algorithms 1246 may use supervised learning to generate an abnormal model including decision boundaries for various monitoring nodes. Each decision boundary may separate two data sets in a high dimensional space which is constructed by running a binary classification algorithm, such as a support vector machine using the normal data 1210 and abnormal data 1220 for each monitoring node signal (e.g., from the sensors 1234, controllers 1236, and/or the actuators 1238).

A real-time abnormality detection platform 1250 may receive the boundaries along with streams of data from the monitoring nodes. The platform 1250 may include a feature extraction on each monitoring node element 1252 and a normalcy decision 1254 with an algorithm to detect attacks in individual signals using signal specific decision boundaries, as well rationalize attacks on multiple signals, to declare which signals were attacked (or are otherwise abnormal), and which became anomalous due to a previous attack on the system via a localization module 1256. An accommodation element 1258 may generate outputs 1270, such as an abnormality status signal, a controller action, and/or a list of abnormal monitoring nodes.

During real-time detection, contiguous batches of control signal data may be processed by the platform 1250, normalized and the feature vector extracted. The location of the vector for each signal in high-dimensional feature space may then be compared to a corresponding decision boundary. If it falls within the abnormal region, then a cyber-attack or fault may be declared. An attack may sometimes be on the actuators 1238 and then manifested in the sensor 1234 data. Attack assessments might be performed in a post decision module (e.g., the localization element 1256) to isolate whether the attack is related to the sensor, controller, or actuator (e.g., indicating which part of the monitoring node). This may be done by individually monitoring, overtime, the location of the feature vector with respect to the hard decision boundary. For example, when a sensor 1234 is spoofed, the attacked sensor feature vector will cross the hard decision boundary earlier than the rest of the vectors as described with respect to FIGS. 13 through 15. If a sensor 1234 is declared to be anomalous, and a command to the auxiliary equipment is later determined to be anomalous, it may be determined that the original attack, such as signal spoofing, occurred on the sensor 1234. Conversely, if the signal to the auxiliary equipment was determined to be anomalous first, and then later manifested in the sensor 1234 feedback signal, it may be determined that the signal to the equipment was initially attacked.

According to some embodiments, it may be detected whether or not a signal is in the normal operating space (or abnormal space) through the use of localized decision boundaries and real-time computation of the specific signal features. Moreover, an algorithm may differentiate between a sensor being attacked as compared to a signal to auxiliary equipment being attacked. The control intermediary parameters and control logical(s) may also be analyzed using similar methods. Note that an algorithm may rationalize signals that become anomalous. An attack on a signal may then be identified.

Figure 13:
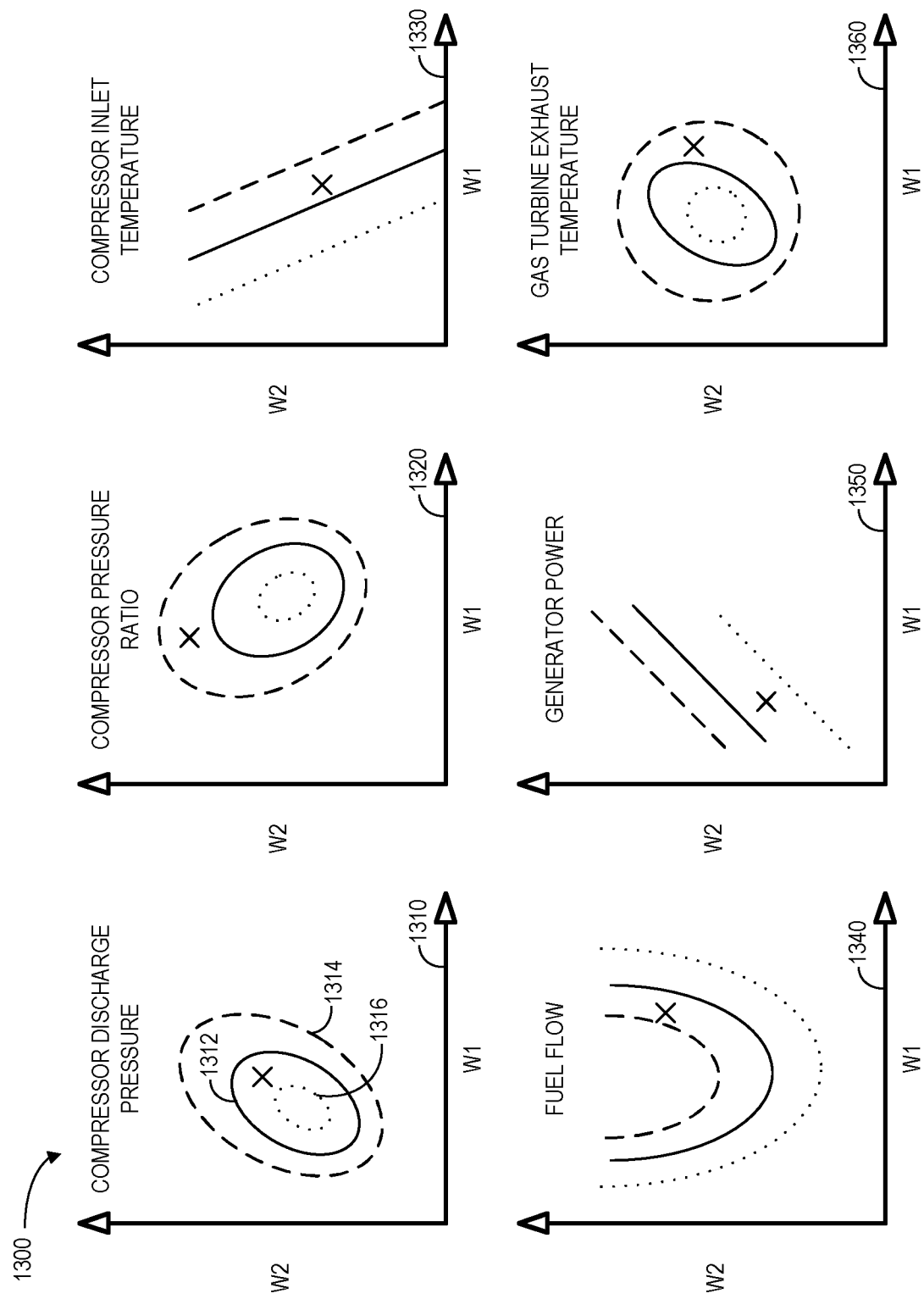
FIGS. 13 through 15 illustrate boundaries and locations of feature vectors for various parameters in accordance with some embodiments.

FIG. 13 illustrates 1300 boundaries and feature vectors for various monitoring node parameters in accordance with some embodiments. In particular, for each parameter a graph includes a first axis representing value weight 1 ("w1"), a feature 1, and a second axis representing value weight 2 ("w2"), a feature 2. Values for w1 and w2 might be associated with, for example, outputs from a Principal Component Analysis ("PCA") that is performed on the input data. PCA might be one of the features that might be used by the algorithm to characterize the data, but note that other features could be leveraged.

A graph is provided for six features: compressor discharge temperature 1310, compressor pressure ratio 1320, compressor inlet temperature 1330, fuel flow 1340, generator power 1350, and gas turbine exhaust temperature 1360. Each graph includes a hard boundary 1312 (solid curve), an inner boundary 1316 (dotted curve), and an outer boundary 1314 (dashed curve) and an indication associated with current feature location for each monitoring node parameter (illustrated with an "X" on the graphs). Note that the boundaries 1312, 1314, 1316 may have been created, according to some embodiments, using normal CPS data and generated abnormal data synthesized by a complementary GAN. As illustrated in FIG. 13, the current monitoring node location is between the minimum and maximum boundaries (that is, the "X" is between the dotted and dashed lines). As a result, the system may determine that the operation of the CPS control system is normal (and no threat is being detected indicating that the system is currently under attack or that a naturally occurring fault has occurred).

Figure 14:
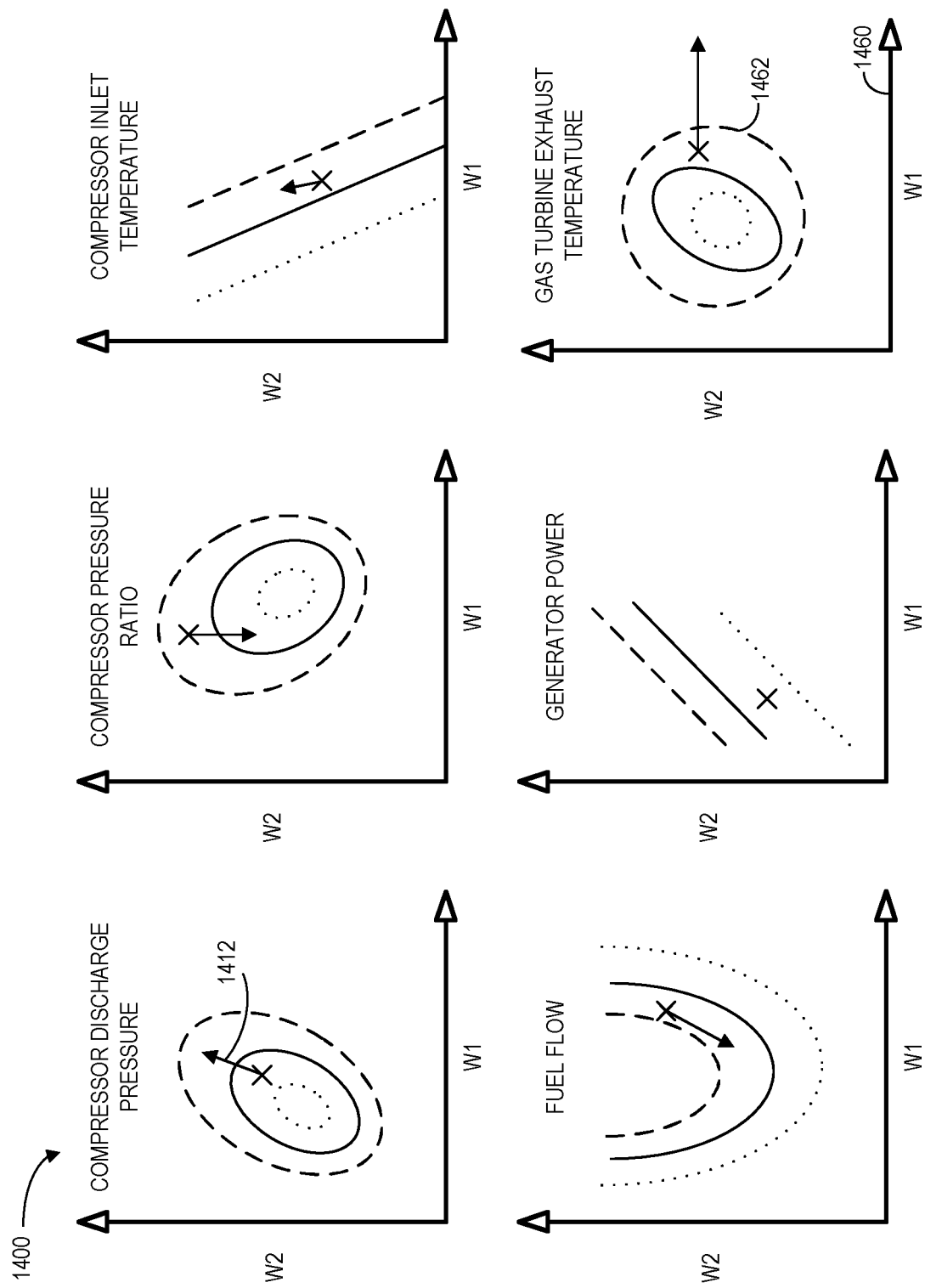

FIG. 14 illustrates 1400 subsequent boundaries and feature vectors for these parameters. Consider, for example, a feature vector movement 1412 for the compressor discharge pressure. Even though feature vector 1412 has moved, it is still within the maximum and minimum boundaries and, as a result, normal operation of that monitoring node may be determined. This is the case for the first five graphs in FIG. 14. In this example, the feature vector for gas turbine exhaust temperature 1460 has moved outside an associated threshold 1462 and, as a result, abnormal operation of a monitoring node may be determined. The algorithm detects this cyber-attack, and two parallel actions might be initiated. One action may be post processing of the signal to discover what was attacked, in this case if the system has been monitoring each exhaust thermocouple, it may conclude that none of them are currently abnormal. Therefore, it may be determined that something used to calculate this feature was attacked. The other action may be to continually monitor and detect additional attacks. Such an approach may facilitate a detection of multiple signal attacks.

Given the example of FIG. 14, assume that the gas turbine exhaust temperature signal was attacked. This may cause the system to respond in such a way so as to put other signals into an abnormal state. This is illustrated 1500 in FIG. 15, where the attack has already been detected and now other signals shown to be abnormal. In particular, feature movement for the compressor discharge pressure 1512, compressor pressure ratio 1522, compressor inlet temperature 1532, and fuel flow 1542 have all become abnormal. Note that the feature vector for generator power did not become abnormal. In order to decide whether or not these signals 1512, 1522, 1532, 1542 are truly currently under attack, a historical batch with pertinent feature vector information may be kept for some duration of time. Then when an attack is detected on another signal, this batch is examined, and the time at which the confirmed attack on gas turbine exhaust temperature as well as several subsequent elements is analyzed.

Note that one signal rationalization might be associated with a system time delay. That is, after a sensor is attacked there might be a period of time before the system returns to a steady state. After this delay, any signal that becomes anomalous might be due to an attack as opposed to the system responding.

The current methods for detecting abnormal conditions in monitoring nodes are limited to Fault Detection Isolation and Accommodation ("FDIA"), which itself is very limited. The hybrid cyber-attack detection and localization algorithms described herein can not only detect abnormal signals of sensors, but can also detect signals sent to auxiliary equipment, control intermediary parameters and/or control logical(s). The algorithms may also understand multiple signal attacks. One challenge with correctly identifying a cyber-attack threat is that it may occur with multiple sensors being impacted by malware. According to some embodiments, an algorithm may identify in real-time that an attack has occurred, which sensor(s) are impacted, and declare a fault response. To achieve such a result, the detailed physical response of the system must be known to create acceptable decision boundaries. This might be accomplished, for example, by constructing data sets for normal and abnormal regions by running DoE experiments on high-fidelity models. A data set for each sensor might comprise a feature vector for given threat values (e.g., temperature, airflow, etc.). Full factorial, Taguchi screening, central composite and Box-Behnken are some of the known design methodologies used to create the attack space. When models are not available, these DoE methods are also used to collect data from a real-world CPS. Experiments may be run at different combinations of simultaneous attacks. In some embodiments, the system may detect degraded/faulty operation as opposed to a cyber-attack. Such decisions might utilize a data set associated with a degraded/faulty operating space. At the end of this process, the system may create data sets such as "attack v/s normal" and "degraded v/s normal" for use while constructing decision boundaries. Further note that a decision boundary may be created for each signal using data sets in feature space. Various classification methods may be used to compute decision boundaries. For example, binary linear and non-linear supervised classifiers are examples of methods that could be used to obtain a decision boundary.

Figure 15:
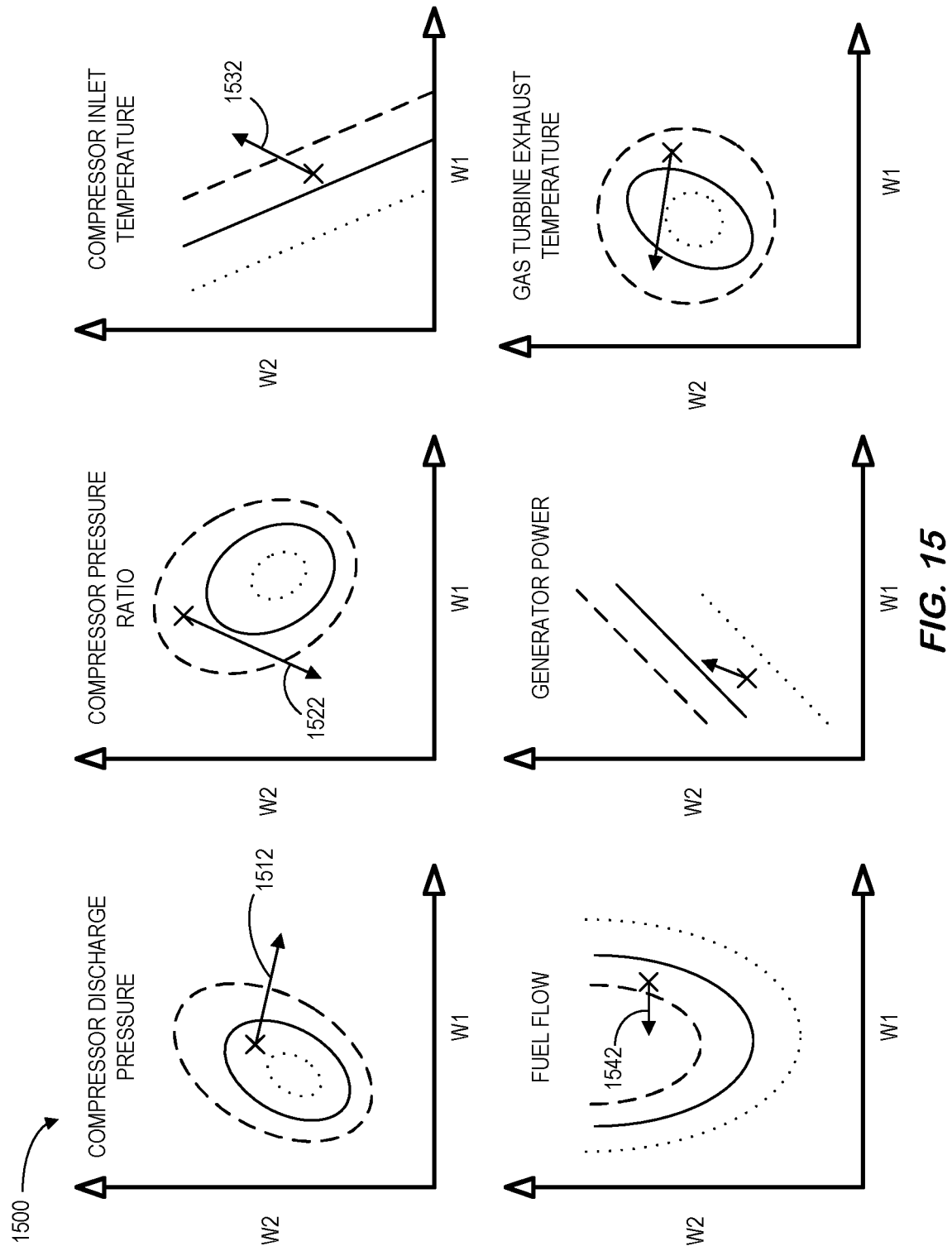

Note that multiple vector properties might be examined, and the information described with respect to FIGS. 13 through 15 may be processed to determine if the signal had been trending in a specific direction as the attack was detected (or if it had just been moving due to noise). Had the signal been uniformly trending as the attack took place and afterward, then this signal is a response to the original attack and not an independent attack.

According to some embodiments, the system may localize or otherwise analyze an origin of the threat to a particular monitoring node. For example, the localizing may be performed in accordance with a time at which a decision boundary associated with one monitoring node was crossed as compared to a time at which a decision boundary associated with another monitoring node was crossed. According to some embodiments, an indication of the particular monitoring node might be included in the abnormality status signal.

Some embodiments described herein may take advantage of the physics of a CPS by learning a priori from tuned high-fidelity equipment models and/or actual "on the job" data to detect single or multiple simultaneous adversarial threats to the system. Moreover, according to some embodiments, all monitoring node data may be converted to features using advanced feature-based methods, and the real-time operation of the CPS may be monitored in substantially real-time. Abnormalities may be detected by classifying the monitored data as being "normal" or disrupted (or degraded). This decision boundary may be constructed using dynamic models and may help to enable early detection of vulnerabilities (and potentially avert catastrophic failures) allowing an operator to restore the CPS to normal operation in a timely fashion.

Thus, some embodiments may provide an advanced anomaly detection algorithm to detect cyber-attacks on, for example, key CPS control sensors. The algorithm may identify which signals(s) are being attacked using control signal-specific decision boundaries and may inform a CPS to take accommodative actions. In particular, a detection and localization algorithm might detect whether a sensor, auxiliary equipment input signal, control intermediary parameter, or control logical are in a normal or anomalous state. Some examples of CPS monitoring nodes that might be analyzed include: critical control sensors; control system intermediary parameters; auxiliary equipment input signals; and/or logical commands to controller.

A cyber-attack detection and localization algorithm may process a real-time CPS signal data stream and then compute features (multiple identifiers) which can then be compared to the sensor specific decision boundary. In some embodiments, generating features may involve simply performing an identity transform. That is, the original signal might be used as it is.

Figure 16:
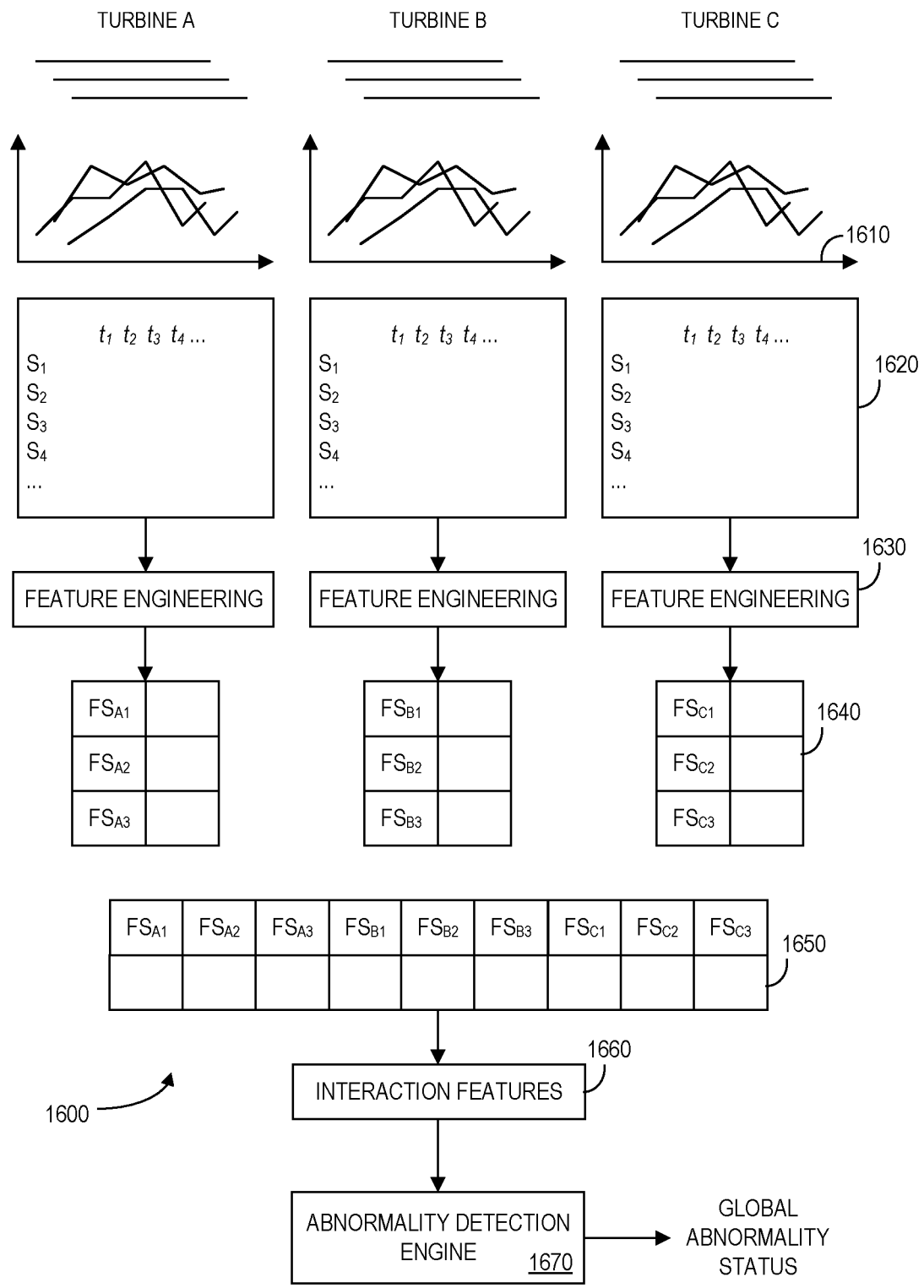
FIG. 16 is an example of a global abnormality protection system in accordance with some embodiments when multiple gas turbines are involved in a system.

Feature vectors may be generated on a monitoring-node-by-monitoring node basis and may be considered "local" to each particular monitoring node. FIG. 16 is an example of a "global" abnormality protection system 1600 in accordance with some embodiments when multiple gas turbines are involved in a system. In particular, the system 1600 includes three turbines (A, B, and C) and batches of values 1610 from monitoring nodes are collected for each generated over a period of time (e.g., 60 to 80 seconds). According to some embodiments, the batches of values 1610 from monitoring nodes overlap in time. The values 1610 from monitoring nodes may, for example, be stored in a matrix 1620 arranged by time ($t_1$, $t_2$, etc.) and by type of monitoring node ($S_1$, $S_5$, etc.). Feature engineering components 1630 may use information in each matrix 1620 to create a feature vector 1640 for each of the three turbines (e.g., the feature vector 1640 for turbine C might include $FS_{C1}$, $FS_{C2}$, etc.). The three feature vectors 1640 may then be combined into a single global feature vector 1650 for the system 1600. Interaction features 1660 may be applied (e.g., associated with A*B*C, A+B+C, etc.) and an abnormality detection engine 1670 may compare the result with a decision boundary and output a global abnormality status signal when appropriate.

Figure 17:
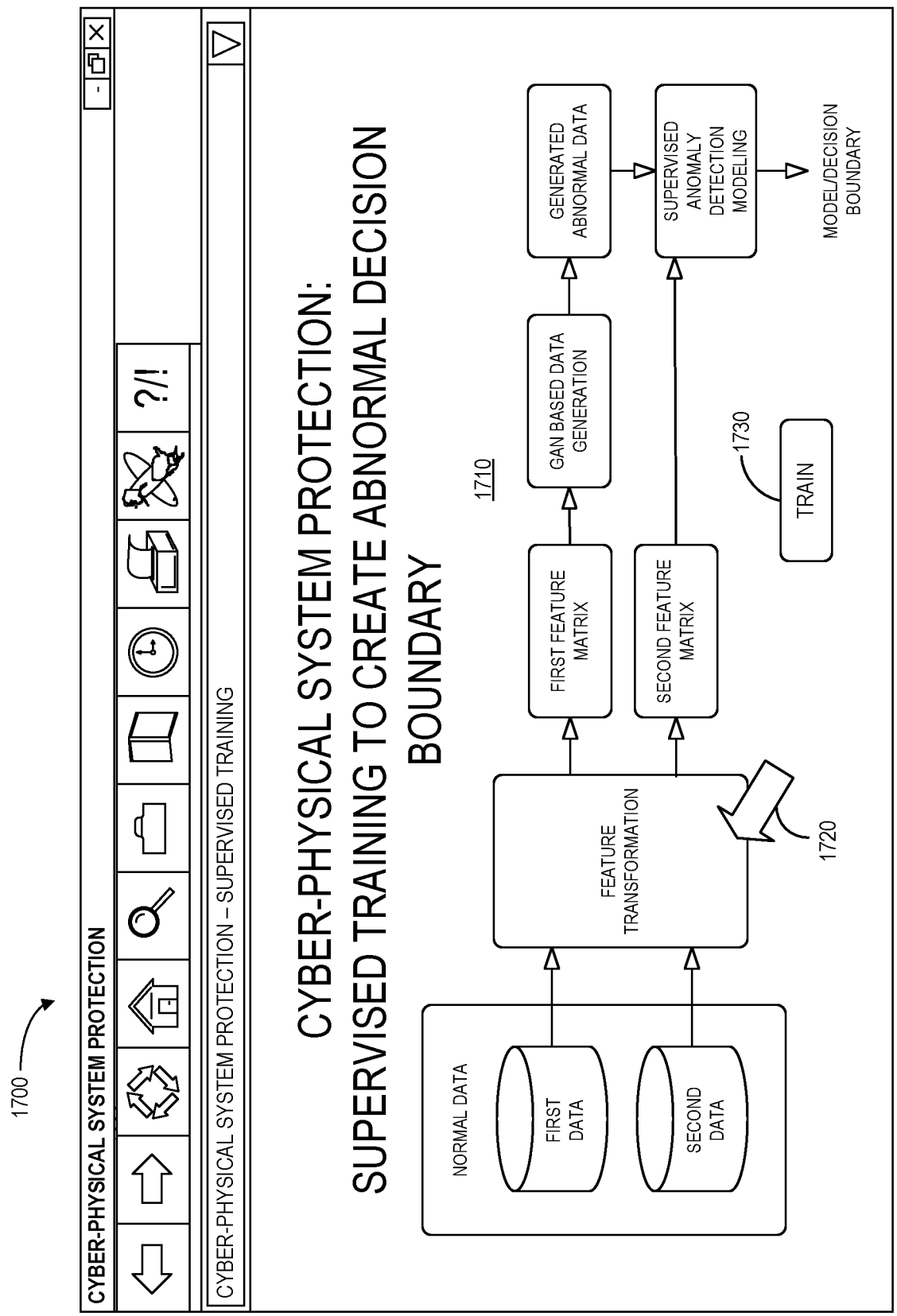
FIG. 17 is a CPS protection system display in accordance with some embodiments.

FIG. 17 is an example of a CPS protection display 1700 that might be used, for example, to provide a graphical depiction of a CPS 1710 (e.g., including system nodes, monitoring nodes, and node connections) to an operator and/or to provide an interactive interface allowing an administrator to adjust system components as appropriate. Selection of an element on the display 1700 (e.g., via a touchscreen or computer mouse pointer 1720) may let the operator see more information about that particular element (e.g., in a pop-up window) and/or adjust operation of that element (e.g., by altering or activating complementary GAN parameters). Selection of a "Train" icon 1730 might cause the system to begin a supervised training process to create a model and/or decision boundary.

Figure 18:
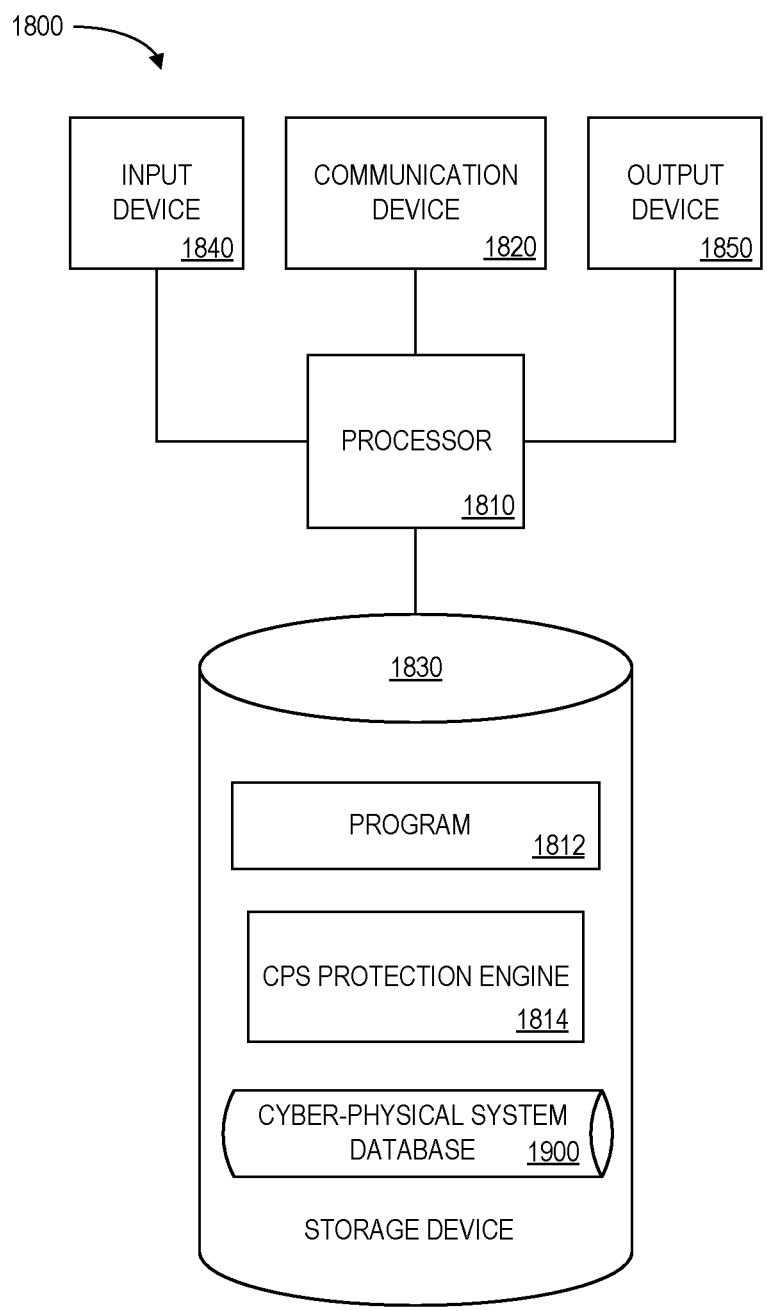
FIG. 18 is a CPS protection platform according to some embodiments.

Note that the embodiments described herein may be implemented using any number of different hardware configurations. For example, FIG. 18 is a block diagram of a CPS protection platform 1800 that may be, for example, associated with the system 400 of FIG. 4 and/or any other system described herein. The CPS protection platform 1800 comprises a processor 1810, such as one or more commercially available Central Processing Units ("CPUs") in the form of one-chip microprocessors, coupled to a communication device 1820 configured to communicate via a communication network (not shown in FIG. 18). The communication device 1820 may be used to communicate, for example, with one or more remote monitoring nodes, user platforms, digital twins, etc. The CPS protection platform 1800 further includes an input device 1840 (e.g., a computer mouse and/or keyboard to input CPS parameters and/or modeling information) and/an output device 1850 (e.g., a computer monitor to render a display, provide alerts, transmit recommendations, and/or create reports). According to some embodiments, a mobile device, monitoring physical system, and/or PC may be used to exchange information with the CPS protection platform 1800.

The processor 1810 also communicates with a storage device 1830. The storage device 1830 may comprise any appropriate information storage device, including combinations of magnetic storage devices (e.g., a hard disk drive), optical storage devices, mobile telephones, and/or semiconductor memory devices. The storage device 1830 stores a program 1812 and/or CPS protection engine 1814 for controlling the processor 1810. The processor 1810 performs instructions of the programs 1812, 1814, and thereby operates in accordance with any of the embodiments described herein. For example, the processor 1810 may utilize information in a normal space data source and a generative model to create generated abnormal data representing abnormal operation of a CPS. The processor 1810 may receive the normal monitoring node values (and generate normal feature vectors) and automatically calculate and output an abnormality detection model including information about a decision boundary created via supervised learning based on the normal feature vectors and the generated abnormal data.

The programs 1812, 1814 may be stored in a compressed, uncompiled and/or encrypted format. The programs 1812, 1814 may furthermore include other program elements, such as an operating system, clipboard application, a database management system, and/or device drivers used by the processor 1810 to interface with peripheral devices.

As used herein, information may be "received" by or "transmitted" to, for example: (i) the CPS protection platform 1800 from another device; or (ii) a software application or module within the CPS protection platform 1800 from another software application, module, or any other source.

In some embodiments (such as the one shown in FIG. 18), the storage device 1830 further stores a CPS database 1900. An example of a database that may be used in connection with the CPS protection platform 1800 will now be described in detail with respect to FIG. 19. Note that the database described herein is only one example, and additional and/or different information may be stored therein. Moreover, various databases might be split or combined in accordance with any of the embodiments described herein.

Figure 19:
FIG. 19 is portion of a tabular CPS database in accordance with some embodiments.

Referring to FIG. 19, a table is shown that represents the CPS database 1900 that may be stored at the CPS protection platform 1800 according to some embodiments. The table may include, for example, entries identifying a CPS to be protected. The table may also define fields 1902, 1904, 1906, 1908, 1910, 1912 for each of the entries. The fields 1902, 1904, 1906, 1908, 1910, 1912 may, according to some embodiments, specify: a CPS identifier 1902, a CPS description 1904, normal data 1906, complementary GAN-generated abnormal data 1908, a supervised learning AD decision boundary 1910, and a status 1912. The CPS database 1900 may be created and updated, for example, when a new physical system is monitored or modeled, an attack is detected, etc.

The CPS identifier 1902 and description 1904 may define a particular asset or system that will be protected. The normal data 1906 might comprise data collected from monitoring nodes during normal operation of the CPS (e.g., when no cyber-attack or fault was occurring). The complementary GAN-generated abnormal data 1908 might comprise data synthesized by a complementary GAN created to "look like" abnormal data (in either feature space or sensor value/data space). The supervised learning AD decision boundary 1910 might comprise a model generated using supervised learning AD techniques based on the normal data 1906 and the complementary GAN-generated abnormal data 1908. The supervised learning AD decision boundary 1910 can then be compared to a current feature vector of the CPS to generate the status 1912. The status 1912 might indicate, for example, that the CPS is currently normal, attacked, experiencing a fault, etc.

Thus, embodiments may provide technical improvements to CPS protection. For example, a novel technique (using a complementary GAN) is employed to generate abnormal data allowing supervised AD techniques to be used to create a feature-based decision boundary. Embodiments may also be associated with a generic technique that can be utilized in a wide range of applications.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). Moreover, although some embodiments are focused on gas turbines, any of the embodiments described herein could be applied to other types of systems including land turbines, wind turbines, power grids, dams, locomotives, additive printers, data centers, airplanes, and autonomous vehicles (including automobiles, trucks, drones, submarines, etc.).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system to protect a cyber-physical system having a plurality of monitoring nodes each generating a series of current monitoring node values over time that represent current operation of the cyber-physical system, comprising:
    a normal space data source storing, for each of the plurality of monitoring nodes, a series of normal monitoring node values over time that represent normal operation of the cyber-physical system;
    an abnormal data generation platform to utilize information in the normal space data source and a generative model comprising a complementary Generative Adversarial Network ("GAN"), the generative model to create generated abnormal data to represent abnormal operation of the cyber-physical system, wherein the generated abnormal data includes attack data and non-attack fault data; and
    an abnormality detection model creation computer platform having a memory and a computer processor adapted to:
        receive the series of normal monitoring node values and generate a set of normal feature vectors, and
        automatically calculate and output an abnormality detection model including information about at least one decision boundary created via supervised learning based on the set of normal feature vectors and the generated abnormal data.

2. The system of claim 1, wherein the abnormal data generation platform creates at least one of: (i) generated abnormal feature information, and (ii) generated abnormal monitoring node sensor values.

3. The system of claim 1, wherein the complementary GAN includes a generator network and a discriminator network.

4. The system of claim 1, wherein the complementary GAN further includes training techniques comprising at least one of: (i) feature matching, (ii) virtual batch normalization, (iii) historical averaging, and (iv) consistence enforcement over consecutive generated samples.

5. The system of claim 1, wherein the abnormal data generation platform creates the generated abnormal data utilizing either: (i) no actual abnormal information from the cyber-physical system, or (ii) sparse actual abnormal information from the cyber-physical system.

6. The system of claim 1, wherein the at least one decision boundary is associated with at least one of: (i) a linear boundary, (ii) a non-linear boundary, and (iii) a plurality of boundaries.

7. The system of claim 1, further comprising:
    an abnormality detection computer coupled to the abnormality detection model creation computer platform having a memory and a computer processor adapted to:

receive, from the plurality of monitoring nodes, a series of values over time that represent current operation of the cyber-physical system, generate at least one current feature vector based on the received series of values that represent current operation of the cyber-physical system, and execute the abnormality detection model to transmit an abnormality status signal based on the set of current feature vectors and the at least one decision boundary.

8. The system of claim 7, wherein at least one decision boundary or abnormality status is associated with a global feature vector.

9. The system of claim 7, wherein at least one decision boundary or abnormality status signal is associated with a local feature vector.

10. The system of claim 1, wherein the cyber-physical system is associated with at least one of: (i) an industrial control system, (ii) a heat recovery and steam generation unit, (iii) a turbine, (iv) a gas turbine, (v) a wind turbine, (vi) an engine, (vii) a jet engine, (viii) a locomotive engine, (ix) a refinery, (x) a power grid, (xi) a dam, (xii) an autonomous vehicle, and (xiii) a drone.

11. The system of claim 1, wherein at least one monitoring node is associated with at least one of: (i) a sensor node, (ii) a critical sensor node, (iii) an actuator node, (iv) a controller node, and (v) a key software node.

12. A method to protect a cyber-physical system having a plurality of monitoring nodes each generating a series of current monitoring node values over time that represent current operation of the cyber-physical system, the method comprising:

utilizing, by an abnormal data generation platform, information in a normal space data source and a generative model comprising a complementary Generative Adversarial Network ("GAN"), the generative model to create generated abnormal data to represent abnormal operation of the cyber-physical system, wherein the generated abnormal data includes attack data and non-attack fault data, and wherein the normal space data source stores, for each of the plurality of monitoring nodes, a series of normal monitoring node values over time that represent normal operation of the cyber-physical system;

receiving, at an abnormality detection model creation computer, the series of normal monitoring node values to generate a set of normal feature vectors; and automatically calculating and outputting an abnormality detection model including information about at least one decision boundary created via supervised learning based on the set of normal feature vectors and the generated abnormal data.

13. The method of claim 12, wherein the complementary GAN includes a generator network and a discriminator network.

14. The method of claim 12, wherein the complementary GAN further includes training techniques comprising at least one of: (i) feature matching, (ii) virtual batch normalization, (iii) historical averaging, and (iv) consistence enforcement over consecutive generated samples.

15. The method of claim 12, wherein the abnormal data generation platform creates the generated abnormal data utilizing either: (i) no actual abnormal information from the cyber-physical system, or (ii) sparse actual abnormal information from the cyber-physical system.

16. The method of claim 12, further comprising:

receiving, at an abnormality detection computer from the plurality of monitoring nodes, a series of values over time that represent current operation of the cyber-physical system;

generating at least one current feature vector based on the received series of values that represent current operation of the cyber-physical system; and executing the abnormality detection model to transmit an abnormality status signal based on the set of current feature vectors and the at least one decision boundary.

17. The method of claim 12, wherein at least one decision boundary or abnormality status is associated with at least one of: (i) a global feature vector, and (ii) a local feature vector.

18. A non-transient, computer-readable medium storing instructions to be executed by a processor to perform a method to protect a cyber-physical system having a plurality of monitoring nodes each generating a series of current monitoring node values over time that represent current operation of the cyber-physical system, the method comprising:

utilizing, by an abnormal data generation platform, information in a normal space data source and a generative model comprising a complementary Generative Adversarial Network "GAN", the generative model to create generated abnormal data to represent abnormal operation of the cyber-physical system, wherein the generated abnormal data includes attack data and non-attack fault data, and wherein the normal space data source stores, for each of the plurality of monitoring nodes, a series of normal monitoring node values over time that represent normal operation of the cyber-physical system;

receiving, at an abnormality detection model creation computer, the series of normal monitoring node values to generate a set of normal feature vectors; and automatically calculating and outputting an abnormality detection model including information about at least one decision boundary created via supervised learning based on the set of normal feature vectors and the generated abnormal data.

* * * * *